United States Patent
Chang et al.

(10) Patent No.: US 11,815,118 B2
(45) Date of Patent: Nov. 14, 2023

(54) FIXING DEVICE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Ching-Chih Chang, Taipei (TW); Pei-Hsuan Huang, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 215 days.

(21) Appl. No.: 17/115,586

(22) Filed: Dec. 8, 2020

(65) Prior Publication Data
US 2022/0042530 A1    Feb. 10, 2022

(30) Foreign Application Priority Data

Aug. 7, 2020    (CN) .......................... 202010789376.0

(51) Int. Cl.
| | | |
|---|---|---|
| *F16B 19/10* | (2006.01) | |
| *F16B 2/22* | (2006.01) | |
| *F16B 17/00* | (2006.01) | |

(52) U.S. Cl.
CPC ................ *F16B 2/22* (2013.01); *F16B 17/00* (2013.01)

(58) Field of Classification Search
CPC .. F16B 2/22; F16B 17/00; F16B 19/10; F16B 19/109
See application file for complete search history.

(56) References Cited

U.S. PATENT DOCUMENTS 3,117,484 A * 1/1964 Myers .................. F16B 5/0208
411/348
3,233,504 A * 2/1966 Jones .................... B25B 31/005
269/48.3

(Continued)

FOREIGN PATENT DOCUMENTS

| CN | 103075399 A | 5/2013 |
|---|---|---|
| CN | 105531487 A | 4/2016 |
| CN | 110030246 A | 7/2019 |

OTHER PUBLICATIONS

Chinese Office Action corresponding to Application No. 202010789376.0 and dated Dec. 26, 2022, 8 pages.

*Primary Examiner* — Jason W San
(74) *Attorney, Agent, or Firm* — Innovation Counsel LLP

(57) ABSTRACT

The fixing device includes a limiting structure and a movement portion. The limiting structure is extended along a first direction and has an accommodation space and at least one pair of hooks disposed at a terminal end of the limiting structure. The extending directions of the at least one pair of hooks are opposite to each other and parallel to a second direction. The movement portion moves relative to the limiting structure. When a bottom of the movement portion is disposed above the at least one pair of hooks, the at least one pair of hooks has a first distance therebetween in the second direction. When the bottom of the movement portion overlaps the at least one pair of hooks in the second direction, the at least one pair of hooks has a second distance greater than the first distance therebetween in the second direction.

20 Claims, 26 Drawing Sheets

(56) References Cited

U.S. PATENT DOCUMENTS

| | | | | |
|---|---|---|---|---|
| 3,426,399 | A * | 2/1969 | Jones | B25B 31/005 24/453 |
| 3,728,761 | A * | 4/1973 | Holly | F16B 5/02 411/908 |
| 4,316,689 | A * | 2/1982 | Sanchez Velasco | F16B 13/066 411/60.2 |
| 4,537,542 | A * | 8/1985 | Pratt | F16B 19/109 24/607 |
| 4,548,533 | A * | 10/1985 | Pratt | F16B 19/109 24/607 |
| 4,934,885 | A * | 6/1990 | Woods | F16B 5/0233 24/453 |
| 5,211,519 | A * | 5/1993 | Saito | F16B 19/1081 411/48 |
| 5,387,065 | A * | 2/1995 | Sullivan | F16B 19/1081 411/48 |
| 7,033,121 | B2 * | 4/2006 | Kirchen | F16B 19/1081 24/453 |
| 7,549,199 | B2 * | 6/2009 | Bugner | F16B 5/0628 411/908 |
| 8,534,651 | B2 * | 9/2013 | Scapa | B25B 31/005 269/49 |
| 9,217,452 | B1 * | 12/2015 | Woodall, Jr. | F16B 19/109 |
| 9,562,549 | B2 * | 2/2017 | McClure | F16B 21/09 |
| 10,260,548 | B2 * | 4/2019 | McClure | F16B 33/002 |
| 10,589,835 | B2 * | 3/2020 | Mills | F16B 19/1081 |
| 10,836,463 | B2 * | 11/2020 | Mills | B64C 1/18 |
| 10,920,815 | B2 * | 2/2021 | Niklewicz | F16B 19/109 |
| 2004/0028503 | A1 * | 2/2004 | Charles | F16B 5/0628 411/510 |
| 2004/0049895 | A1 * | 3/2004 | Draggoo | F16B 5/065 24/297 |
| 2008/0219758 | A1 * | 9/2008 | Jatzke | B60R 13/0206 403/282 |
| 2012/0230796 | A1 * | 9/2012 | McClure | F16B 19/109 411/80.1 |
| 2012/0291240 | A1 * | 11/2012 | Suzuki | F16B 21/075 24/633 |
| 2013/0084130 | A1 * | 4/2013 | McClure | F16B 5/06 403/327 |
| 2013/0136559 | A1 * | 5/2013 | Hauser | F16B 5/065 411/45 |
| 2014/0047679 | A1 * | 2/2014 | Lepper | F16B 21/082 24/453 |
| 2014/0050548 | A1 * | 2/2014 | Loewe | F16B 5/0657 411/48 |
| 2015/0263468 | A1 * | 9/2015 | Chen | H01R 13/6477 439/607.01 |
| 2016/0138628 | A1 * | 5/2016 | Niklewicz | F16B 21/00 411/57.1 |
| 2016/0138629 | A1 * | 5/2016 | Flynn | F16B 13/063 411/57.1 |
| 2016/0298668 | A1 * | 10/2016 | Kanie | F16B 21/076 |
| 2016/0333917 | A1 * | 11/2016 | Aikawa | F16B 5/0642 |
| 2017/0198738 | A1 * | 7/2017 | Najima | F16B 13/06 |
| 2017/0211607 | A1 * | 7/2017 | Hernandez | F16B 19/109 |
| 2017/0234348 | A1 * | 8/2017 | McClure | F16B 13/045 411/49 |
| 2017/0268552 | A1 * | 9/2017 | McClure | F16B 13/063 |
| 2017/0291558 | A1 * | 10/2017 | Meyers | F16B 19/1081 |
| 2018/0313380 | A1 * | 11/2018 | Cox | B60R 13/0206 |
| 2019/0032696 | A1 * | 1/2019 | Sbongk | B60R 13/0243 |
| 2019/0048907 | A1 * | 2/2019 | Sugiyama | F16B 21/075 |
| 2020/0049186 | A1 * | 2/2020 | Ai | F16B 21/086 |
| 2020/0158155 | A1 * | 5/2020 | Weissenfeld | F16B 5/0657 |
| 2020/0217345 | A1 * | 7/2020 | Liebelt | F16B 21/075 |
| 2020/0290180 | A1 * | 9/2020 | Palette | B25B 13/488 |
| 2022/0042530 | A1 * | 2/2022 | Chang | F16B 17/00 |
| 2022/0186758 | A1 * | 6/2022 | Chang | F16B 5/0642 |
| 2022/0373011 | A1 * | 11/2022 | McClure | F16B 13/0833 |

* cited by examiner

FIXING DEVICE

BACKGROUND OF THE INVENTION

This application claims the benefit of People's Republic of China application Serial No. 202010789376.0, filed Aug. 7, 2020, the subject matter of which is incorporated herein by reference.

Field of the Invention

The invention relates in general to a fixing device and more particularly to a fixing device having a movement portion.

Description of the Related Art

In general, two plate structures are mounted together using screws or plugs through the use of hand tool or electrical tool and require a large amount of operation time and labor. Therefore, the assembly and disassembly of two plate structures cannot be done efficiently.

Therefore, it has become a prominent task for the industries to provide a fixing device to improve the efficiency in the assembly and disassembly of two plate structures.

SUMMARY OF THE INVENTION

The present invention relates to a fixing device capable of resolving the above problems. The fixing device includes a limiting structure and a movement portion. The limiting structure includes a pair of hooks. When the movement portion moves relative to the limiting structure, the distance between the hooks can be adjusted, such that the two plate structures connected to the fixing device can be mutually fixed in an easy and timesaving manner.

According to one embodiment of the present invention, a fixing device is provided. The fixing device includes a limiting structure and a movement portion. The limiting structure is extended along a first direction and has an accommodation space and at least one pair of hooks located at the terminal end of the limiting structure. The extending directions of the at least one pair of hooks are opposite to each other and respectively are parallel to a second direction perpendicular to the first direction. The movement portion is disposed in the accommodation space and moves relative to the limiting structure. When a bottom of the movement portion is disposed on at least one pair of hooks, the at least one pair of hooks has a first distance therebetween in the second direction. When the bottom of the movement portion overlaps the at least one pair of hooks in the second direction, the at least one pair of hooks has a second distance greater than the first distance therebetween in the second direction.

The benefit of the present invention is as follows: when the movement portion of the fixing device moves relative to the limiting structure, the distance between the hooks can be adjusted, such that the two plate structures connected to the fixing device can be mutually fixed in an easy and timesaving manner.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

The principles of the structure and operation of the present invention are disclosed below with accompanying drawings.

Figure 1A:
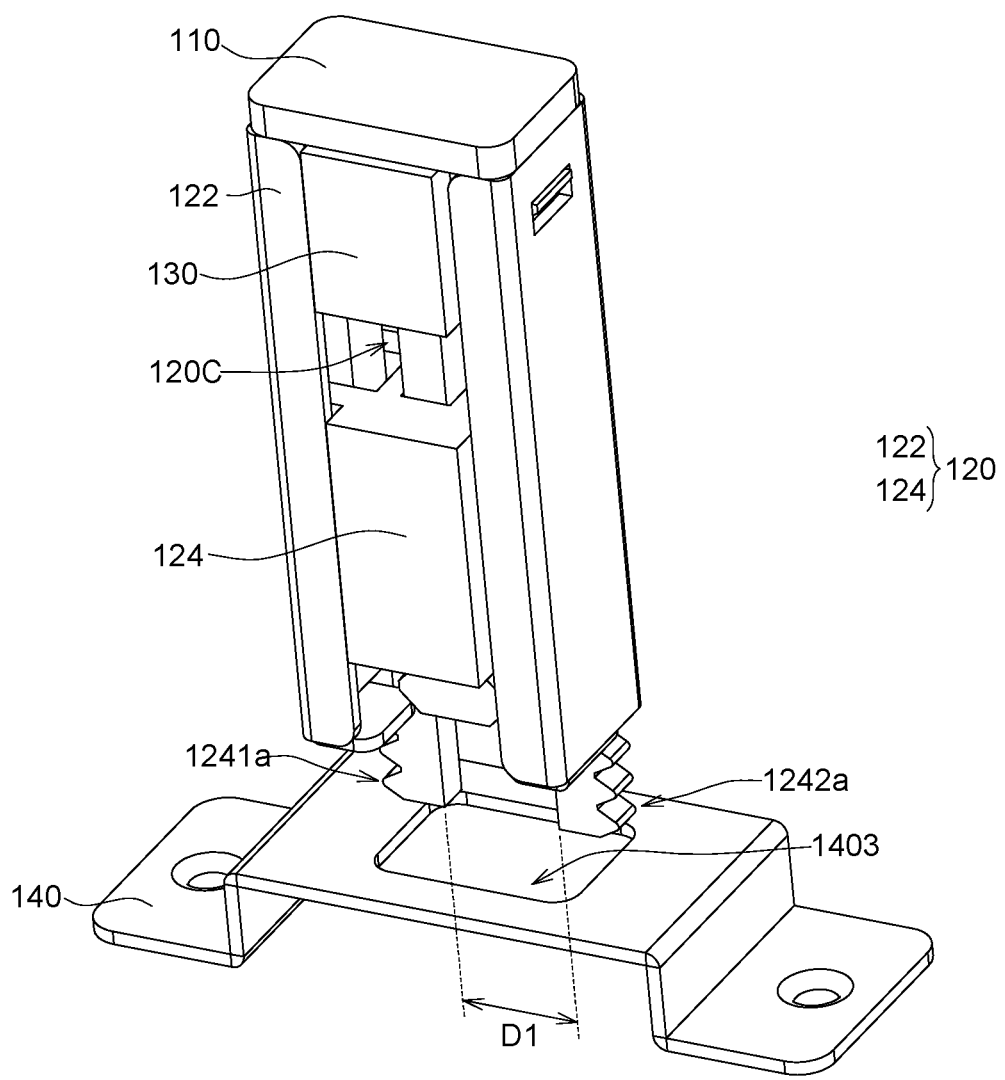
FIG. 1A is a front view of a fixing device according to an embodiment of the present invention.
Figure 1B:
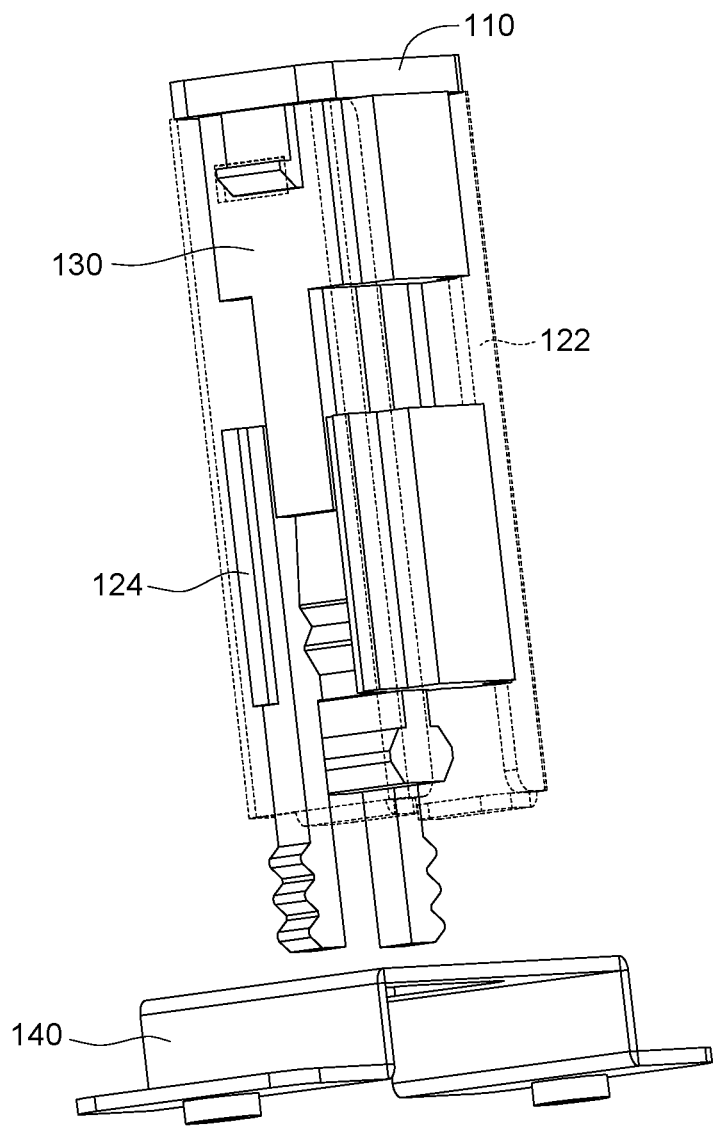
FIG. 1B is a rear view of a fixing device according to an embodiment of the present invention (the first limiting member is represented by dotted lines).

FIG. 1A is a front view of a fixing device 10 according to an embodiment of the present invention. FIG. 1B is a rear view of a fixing device 10 according to an embodiment of the present invention (the first limiting member 122 is represented by dotted lines). FIG. 1O is an explosion diagram of a fixing device 10 according to an embodiment of the present invention. FIG. 1D is a schematic diagram of a first limiting member 122 according to an embodiment of the present invention. FIG. 1E is a schematic diagram of a second limiting member 124 according to an embodiment of the present invention. FIG. 1F is a schematic diagram of a movement portion 130 according to an embodiment of the present invention. FIGS. 2A~3C are schematic diagrams of a fixing device 10 engaged with a counter member 140 according to an embodiment of the present invention.

Figure 1C:
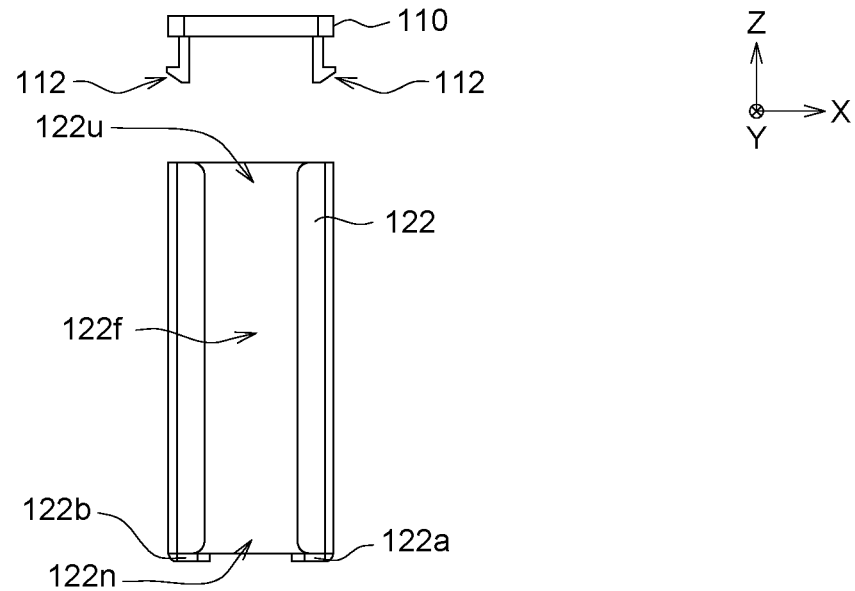
FIG. 1C is an explosion diagram of a fixing device 10 according to an embodiment of the present invention.
Figure 1C:
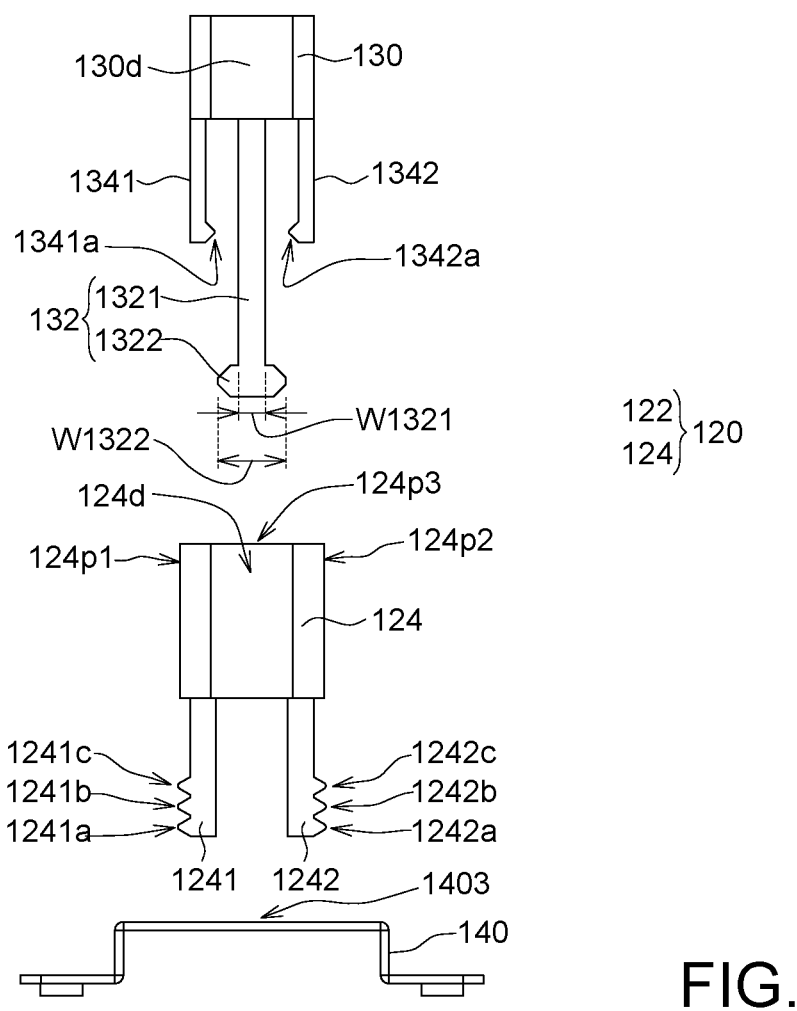
Figure 1D:
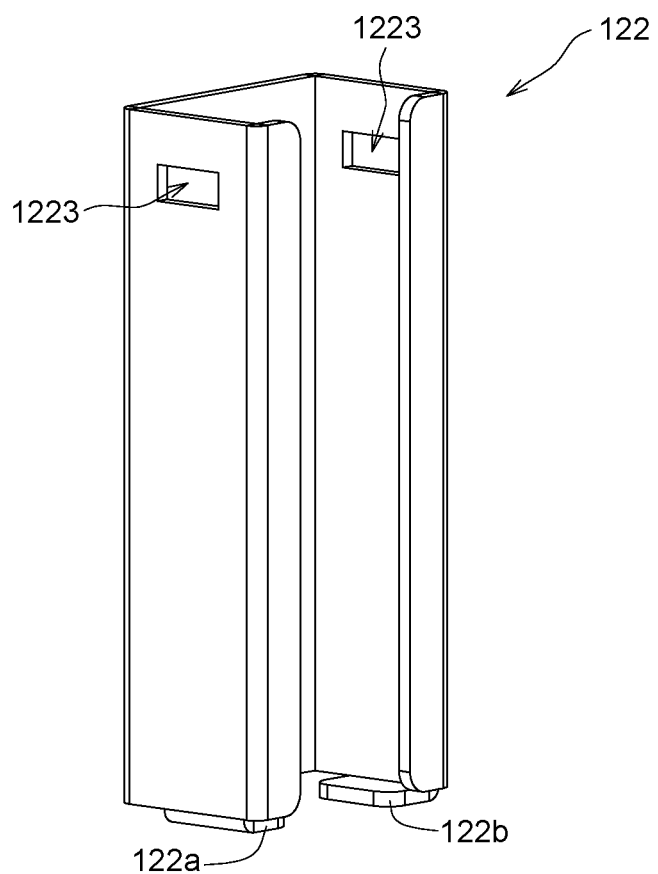
FIG. 1D is a schematic diagram of a first limiting member according to an embodiment of the present invention.
Figure 1E:
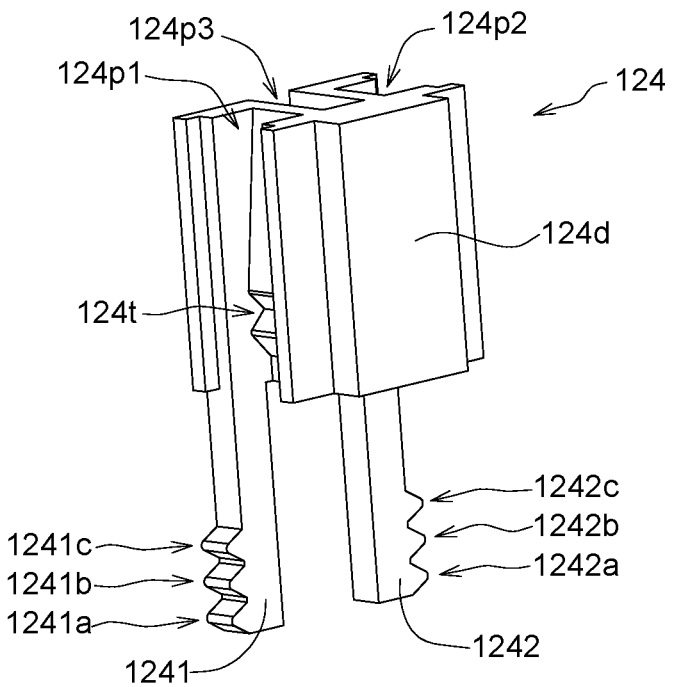
FIG. 1E is a schematic diagram of a second limiting member according to an embodiment of the present invention.
Figure 1F:
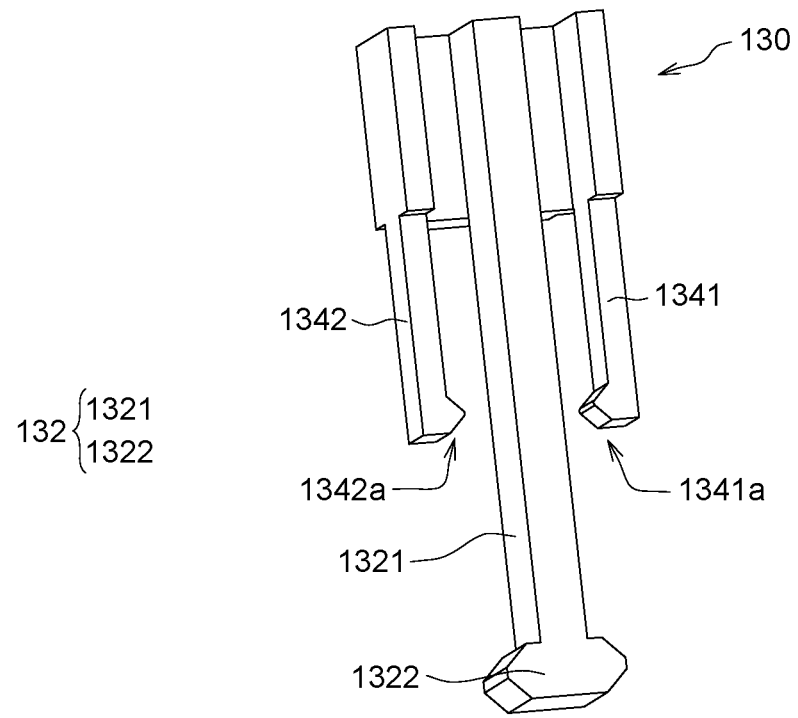
FIG. 1F is a schematic diagram of a movement portion according to an embodiment of the present invention.

Referring to FIGS. 1A~1C, the fixing device 10 includes an upper cover 110, a limiting structure 120 and a movement portion 130. The limiting structure 120 is extended along a first direction (Z direction) and has an accommodation space 120C and at least one pair of hooks (1241a and 1242a, 1241b and 1242b; 1241c and 1242c). The hooks (1241a and 1242a; 1241b and 1242b; 1241c and 1242c) are engaged with a counter member 140. The quantity of pairs of hooks is exemplified by three in the present embodiment, but the present invention is not limited thereto, and the quantity of the hooks can be adjusted to fit actual needs. Furthermore, the limiting structure 120 includes a first limiting member 122 and a second limiting member 124. In some embodiments, the upper cover 110, the limiting structure 120 (including the first limiting member 122 and the second limiting member 124) and the movement portion 130 can be formed of plastics, reinforced plastics or other suitable materials.

Refer to FIGS. 1A~1D. The first limiting member 122 such as a sleeve-shaped housing structure, includes an upper end opening 122u, a lower end opening 122n and a front side opening 122f. The lower end opening 122n is opposite to the upper end opening 122u. The front side opening 122f, which is interconnected with the upper end opening 122u, the lower end opening 122n and the accommodation space 120C, exposes a part of the second limiting member 124 and the movement portion 130. The first limiting member 122 further includes two blocking pieces 122a and 122b, which correspond to the lower end opening 122n (for example, the two blocking pieces 122a and 122b are disposed on two opposite sides of the lower end opening 122n) and are extended to the inside of the first limiting member 122 in a direction parallel to the second direction (such as X direction), to position the second limiting member 124 (details are disclosed below). In some embodiments, the upper cover 110 corresponds to the upper end opening 122u. After the second limiting member 124 and the movement portion 130 are sequentially assembled to the first limiting member 122, the upper cover 110 can then be assembled to the first limiting member 122. Two opposite sides of the upper cover 110 respectively have a fixing mechanism 112 and the two sides of the first limiting member 122 respectively have a side through hole 1223 in which the fixing mechanism 112 is engaged.

Referring to FIGS. 1A~1C and FIG. 1E, the second limiting member 124 includes a body portion 124d, two extending portions 1241 and 1242, two side grooves 124p1 and 124p2 and a rear end groove 124p3. The extending portions 1241 and 1242 are connected to the body portion 124d. The hooks (such as 1241a and 1242a, 1241b and 1242b; 1241c and 1242c) are disposed at a terminal end of the lower part of the limiting structure 120. That is, the hooks (such as 1241a and 1242a; 1241b and 1242b; 1241c and 1242c) are formed at the bottoms of the extending portions 1241 and 1242 and are adjacent to the counter member 140 and are engaged with the counter member 140 (details are disclosed below). For example, the extending directions of each pair of hooks (such as 1241a and 1242a, 1241b and 1242b; 1241c and 1242c) are opposite to each other and are parallel to a second direction (such as X direction) perpendicular to the first direction. In some embodiments, the width between the tips of each pair of hooks (such as 1241a and 1242a; 1241b and 1242b; 1241c and 1242c) in the second direction can be greater than the width of the body portion 124d of the second limiting member 124 in the second direction. The side grooves 124p1 and 124p2 are disposed on two opposite sides of the body portion 124d. The rear end groove 124p3 is disposed between the side grooves 124p1 and 124p2, and the side grooves 124p1 and 124p2 may be separated from each other. Notches 124t may be formed in the side grooves 124p1 and 124p2 to accommodate the side fixing members 1341 and 1342 of the movement portion 130 (details are disclosed below).

Referring to FIGS. 1A~1C and FIG. 1F, the movement portion 130 includes a core portion 130d, two side fixing members 1341 and 1342 and a middle fixing member 132. The side fixing members 1341 and 1342 are connected to the core portion 130d. The latch structures 1341a and 1342a are formed at the terminal ends of the side fixing members 1341 and 1342, respectively. The middle fixing member 132 is connected to the core portion 130d and is disposed between the side fixing members 1341 and 1342. The middle fixing member 132 includes a rod portion 1321 and is connected to an expanded portion 1322 of the rod portion 1321, wherein the width W1322 of the expanded portion 1322 in the second direction is greater than the width W1321 of the rod portion 1321 in the second direction. In some embodiments, the width of the expanded portion 1322 in a third direction (such as Y direction) is greater than the width of the rod portion 1321 in the third direction (not illustrated), wherein the third direction is perpendicular to the first direction and the second direction to implement dual-axis (that is, X axis and Y axis) fixing. In some embodiments, the cross-section of the expanded portion 1322 (such as the cross-section parallel to the plane formed by the second direction and the third direction) can be a circle (not illustrated) and the diameter of the circular cross-section of the expanded portion 1322 can be greater than the width of the rod portion 1321 in the third direction or the second direction to implement multi-axis fixing. In some embodiments, the movement portion 130 is disposed in the accommodation space 120C, and at least one portion of the movement portion 130 is disposed between the first limiting member 122 and the second limiting member 124, wherein the movement portion 130 can move relative to the limiting structure 120. For example, the movement portion 130 can move along a direction parallel to the first direction. After the movement portion 130 is assembled to the second limiting member 124, the core portion 130d of the movement portion 130 is closer to the upper end opening 122u than the body portion 124d of the second limiting member 124, and the rod portion 1321 of the movement portion 130 passes through the rear end groove 124p3 of the second limiting member 124. The side grooves 124p1 and 124p2 of the second limiting member 124 are configured to accommodate the side fixing members 1341 and 1342 of the movement portion 130 respectively and are engaged with the notches 124t through the latch structures 1341a and 1342a to fix the second limiting member 124 and the movement portion 130. Several notches 124t are formed on the side grooves 124p1 and 124p2 respectively, and when the movement portion 130 is pushed, the distance between the movement portion 130 and the counter member 140 can be adjusted according to the positions of the notches 124t.

In some embodiments, the counter member 140 has a top through hole 1403, and as the bottoms of the movement portion 130 and the second limiting member 124 pass through the top through hole 1403, the hooks (such as 1241a and 1242a; 1241b and 1242b; 1241c and 1242c) of the second limiting member 124 are engaged with the counter member 140. As indicated in FIG. 1A-1B, when the core portion 130d of the movement portion 130 is adjacent to the upper end opening 122u of the first limiting member 122 and a bottom (such as the expanded portion 1322) of the movement portion 130 is disposed on the hooks (such as 1241a and 1242a; 1241b and 1242b; 1241c and 1242c) (for example, the bottom corresponds to the first limiting member 122), a first distance D1 is formed between the hooks (such as 1241a and 1242a; 1241b and 1242b; 1241c and 1242c) in the second direction. Meanwhile, since the hooks (such as 1241a and 1242a; 1241b and 1242b; 1241c and 1242c) have not yet passed through the top through hole 1403 of the counter member 140, the first distance D1 between the hooks (such as 1241a and 1242a; 1241b and 1242b; 1241c and 1242c) in the second direction can be adjusted by an external force parallel to the second direction (for example, the first distance D1 may be contracted or expanded by the external force). In the specification, the first distance D1 refers to the distance which is not affected by an external force parallel to the second direction.

Figure 2A:
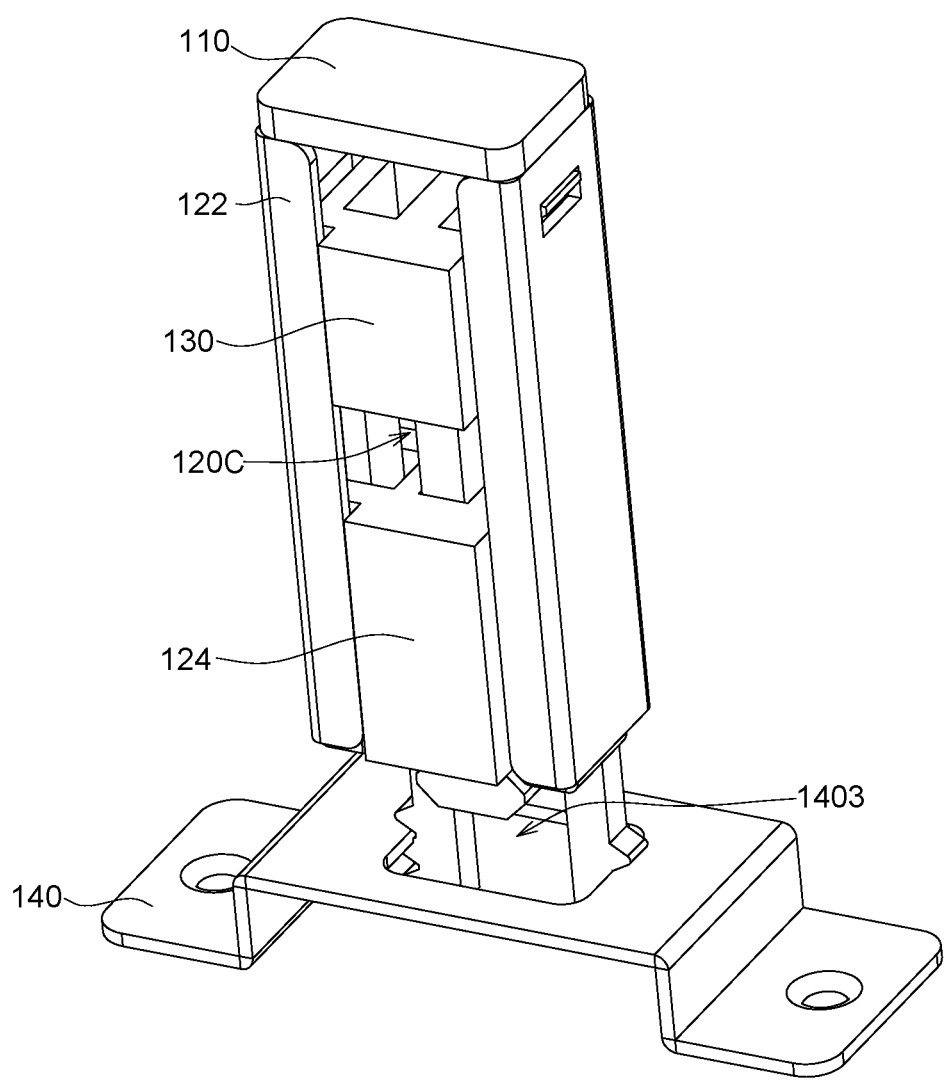
FIGS. 2A~3C are schematic diagrams of a fixing device engaged with a counter member according to an embodiment of the present invention.
Figure 2B:
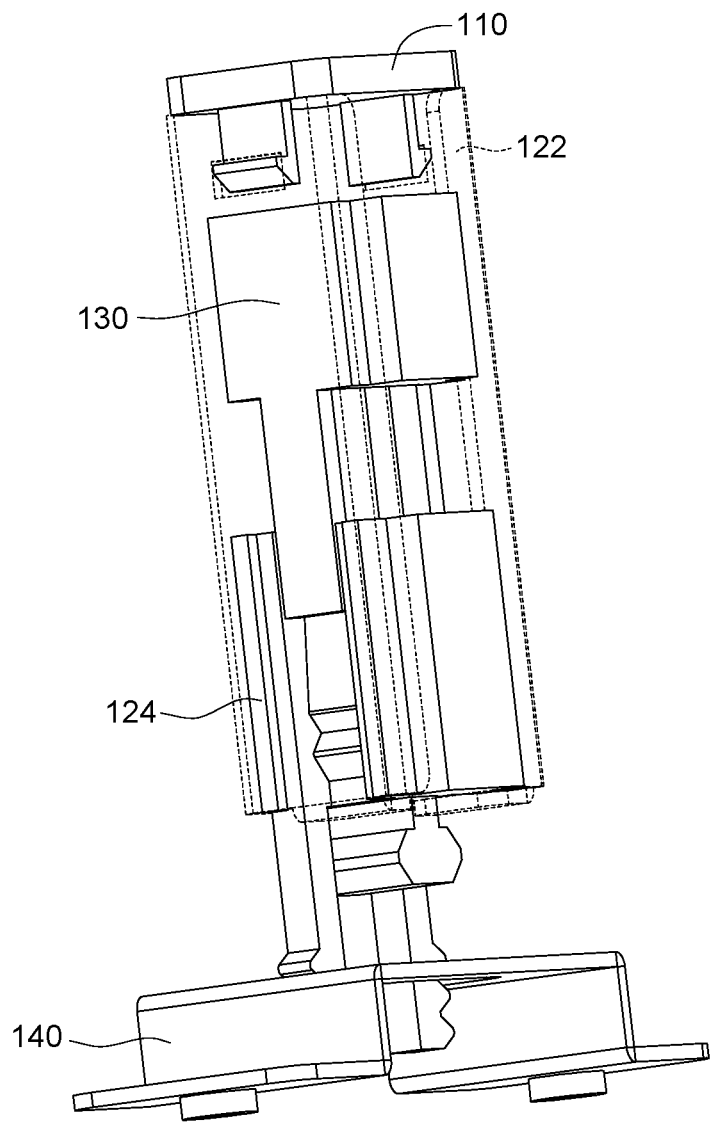
Figure 3A:
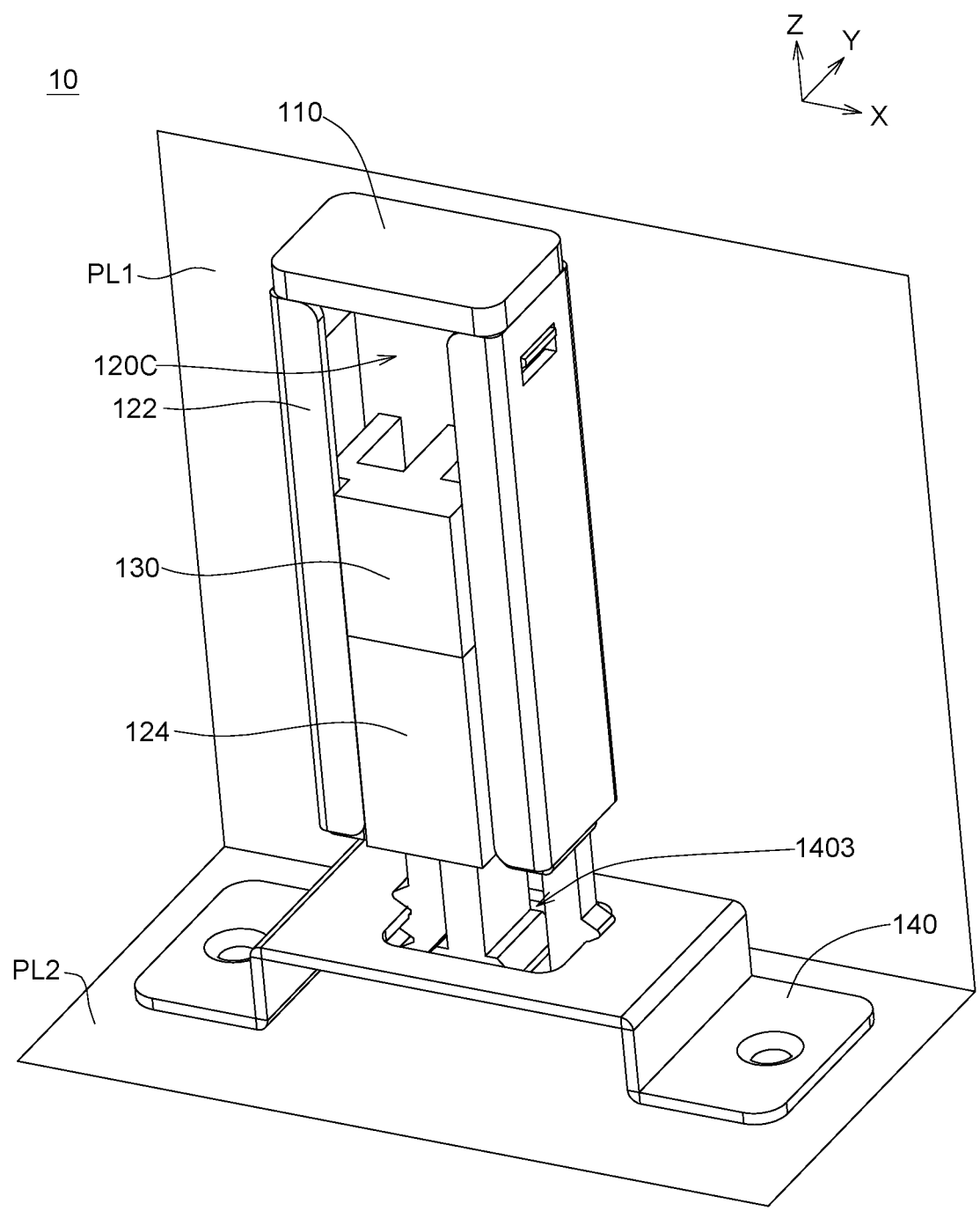
Figure 3B:
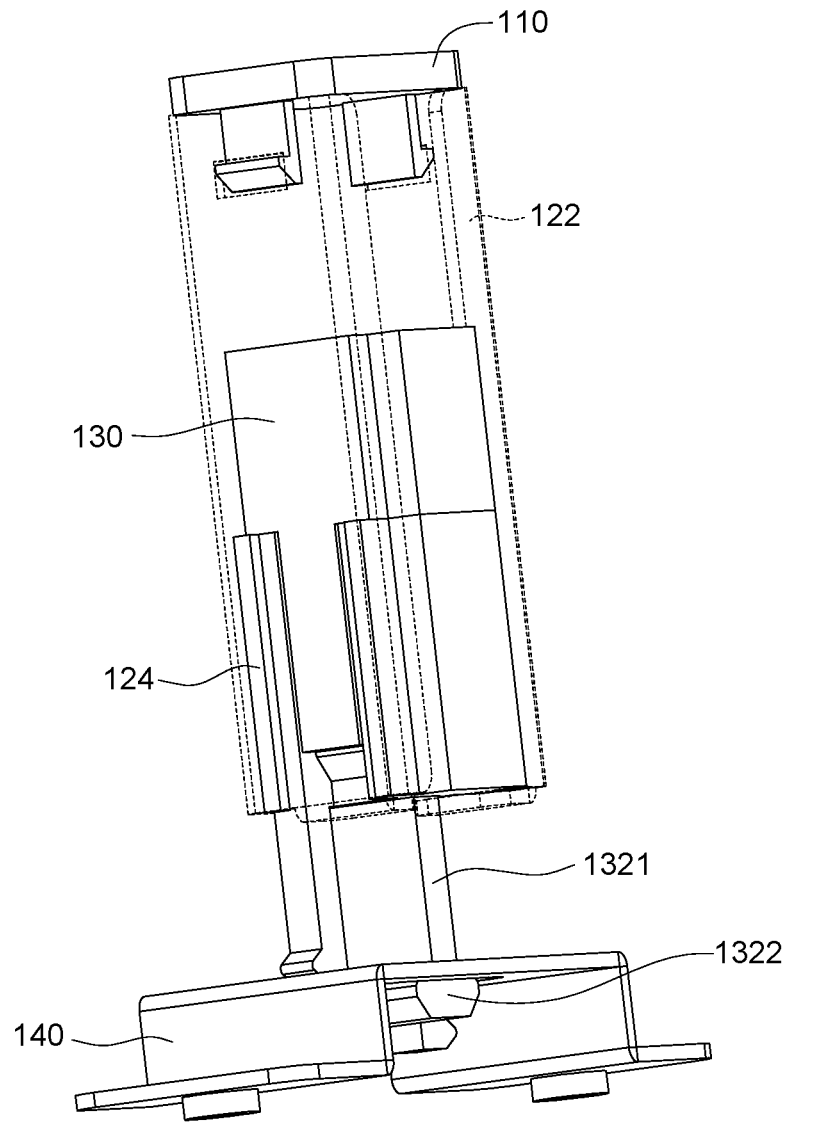
Figure 3C:
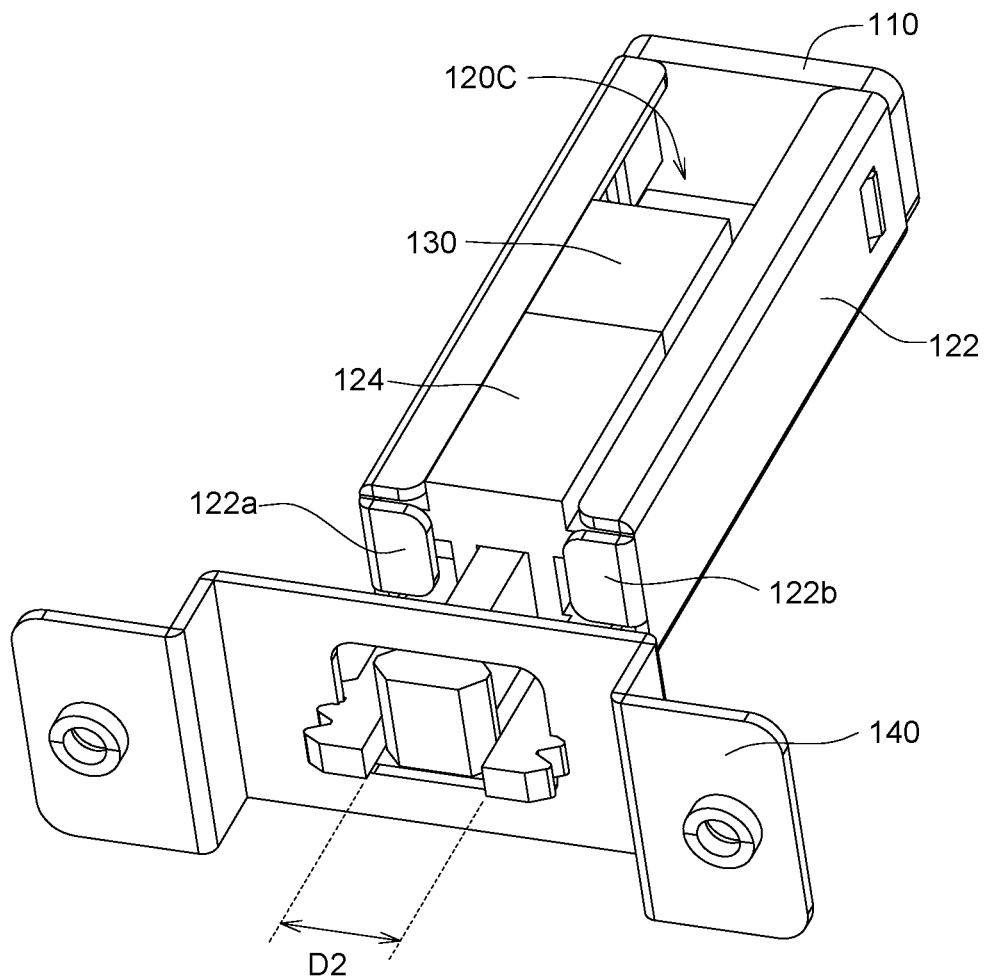

The movement portion 130 can move relative to the first limiting member 122 or the counter member 140. For example, the fixing device 10 can approach the counter member 140 and drive the hooks (such as 1241a and 1242a; 1241b and 1242b; 1241c and 1242c) of the second limiting member 124 to correspond to the top through hole 1403 of the counter member 140 as indicated in FIGS. 1A~1B. Then, the movement portion 130 is moved towards the counter member 140 (such as downwards) and drives the second limiting member 124 to move towards the counter member 140, such that a portion of the hooks (such as 1241a and 1242a, 1241b and 1242b) can pass through the top through hole 1403 as indicated in FIGS. 2A~2B. Afterwards, the movement portion 130 is further be moved towards the counter member 140 (such as downwards), the blocking pieces 122a and 122b position the second limiting member 124, and the two sides of the expanded portion 1322 disposed at the bottom of the movement portion 130 may abut on the extending portions 1241 and 1242 to provide a supporting force parallel to the second direction (such as X direction), such that the hooks (such as 1241a and 1242a) can be firmly engaged with the counter member 140 and will not come off easily as indicated in FIGS. 3A~3C. When the bottom of (such as the expanded portion 1322) of the movement portion 130 overlaps the hooks (such as 1241a and 1242a; 1241b and 1242b; 1241c and 1242c) in the second direction (such as X direction), a second distance D2 is formed between the hooks (such as 1241a and 1242a, 1241b and 1242b; 1241c and 1242c) in the second direction (such as X direction), wherein the second distance D2 can be greater than the first distance D1. That is, the expanded portion 1322 can abut on the hooks (such as 1241a and 1242a, 1241b and 1242b; 1241c and 1242c) to increase the distance between the hooks (such as 1241a and 1242a, 1241b and 1242b; 1241c and 1242c).

In some embodiments, the back of the first limiting member 122, such as a planar housing, is fixed on a first plate structure PL1, and the bottom of the counter member 140 is fixed on a second plate structure PL2 as indicated in FIG. 3A. When the movement portion 130 pushes the second limiting member 124 downwards and passes through the expanded portion 1322, the hooks (such as 1241a and 1242a; 1241b and 1242b; 1241c and 1242c) are firmly engaged with the counter member 140, and the first plate structure PL1 and the second plate structure PL2 are mutually fixed together, wherein the first plate structure PL1 is perpendicular to the second plate structure PL2.

In the present embodiment, both the cross-section (such as the plane formed by X direction and Y direction) of the fixing device 10 (including an upper cover 110, a limiting structure 120 and a movement portion 130) and the cross-section of the top through hole 1403 are rectangular, but the present invention is not limited thereto. In other embodiments, both the cross-section of the fixing device 10 and the cross-section of the top through hole 1403 can be a circle, a square, a triangle or a polygon.

Figure 4A:
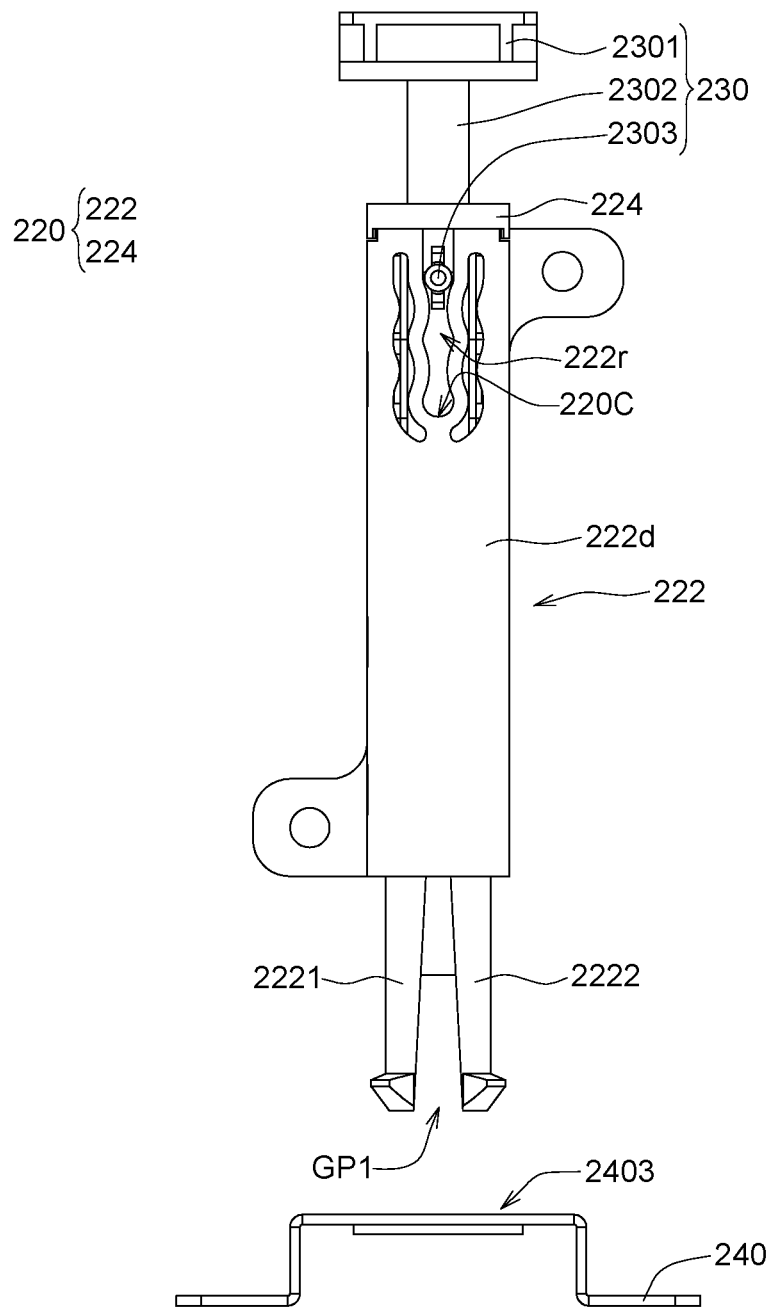
FIG. 4A is a front view of a fixing device according to an embodiment of the present invention.
Figure 4B:
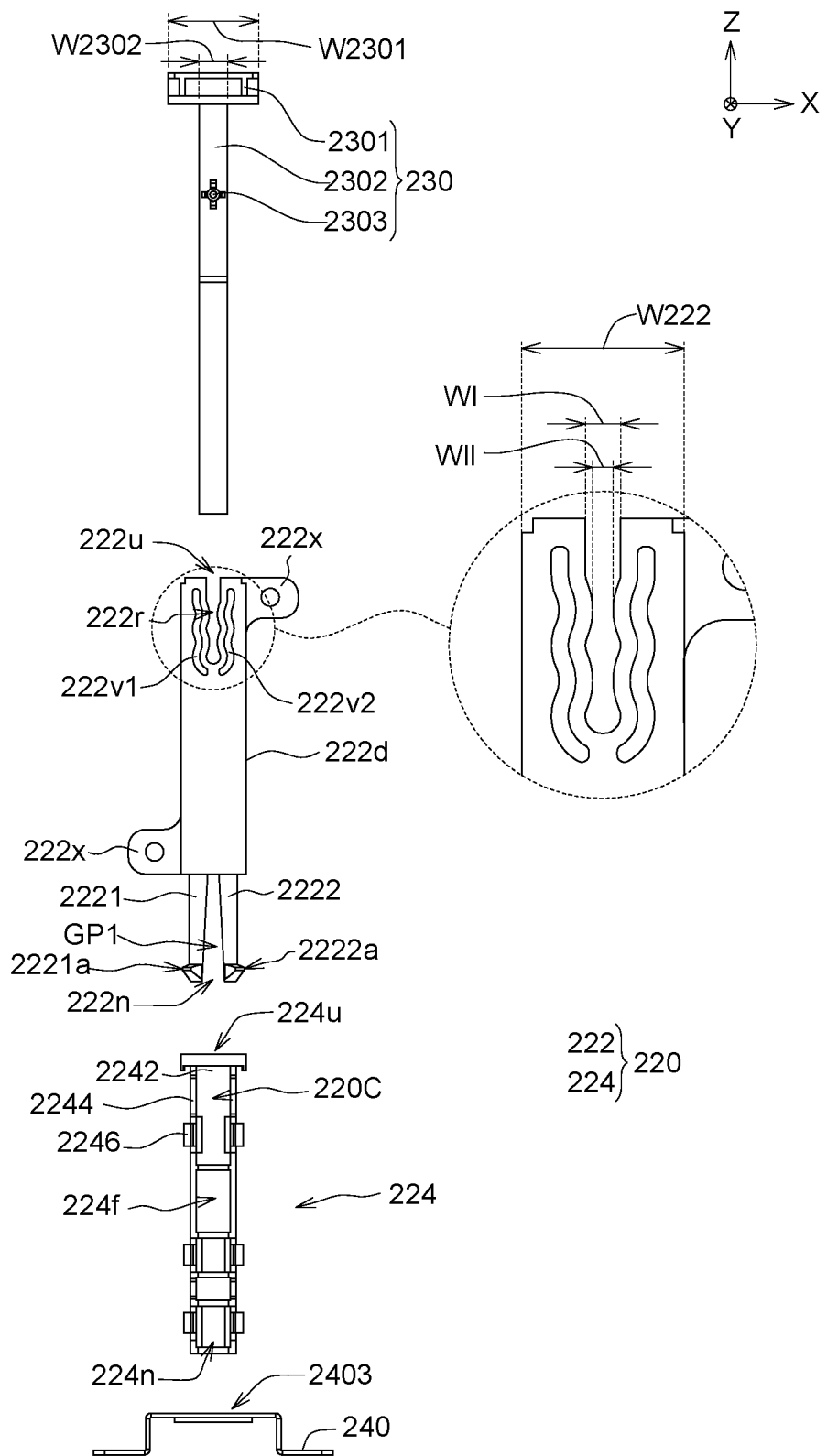
FIG. 4B is an explosion diagram of a fixing device according to an embodiment of the present invention.
Figure 4C:
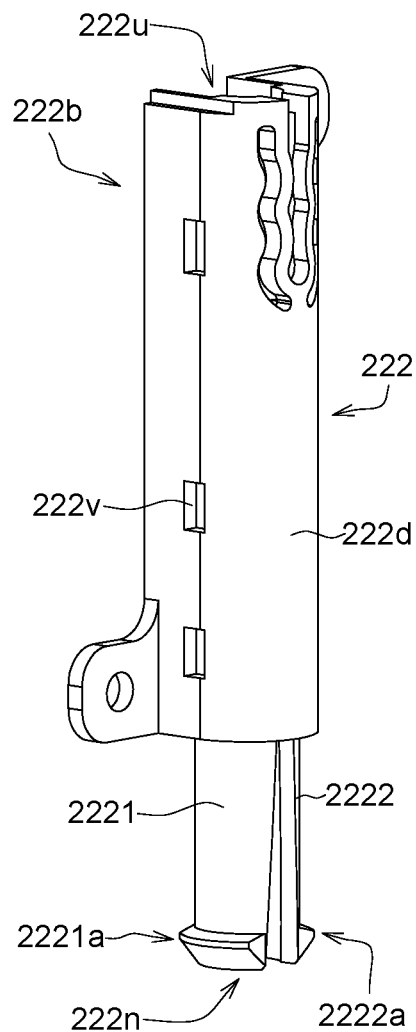
FIG. 4C is a left side view of a first limiting member according to an embodiment of the present invention.
Figure 4D:
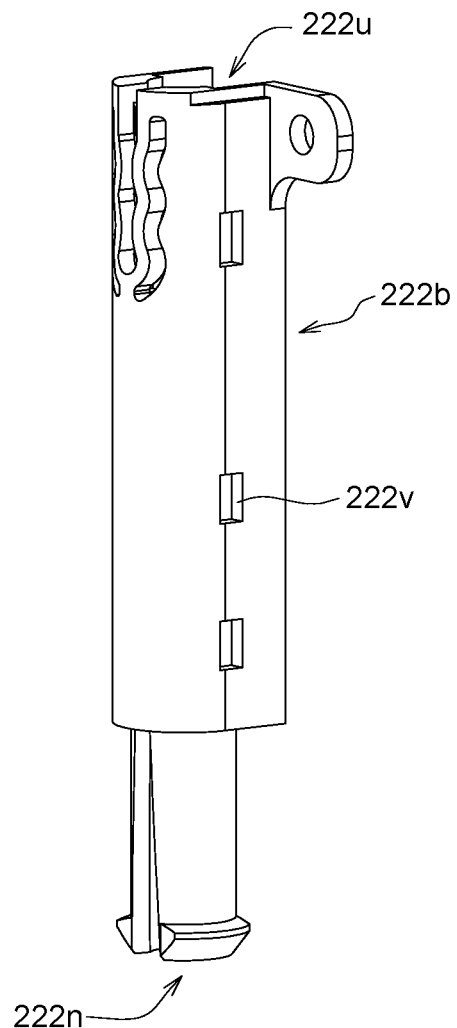
FIG. 4D is a right side view of a first limiting member according to an embodiment of the present invention.
Figure 4E:
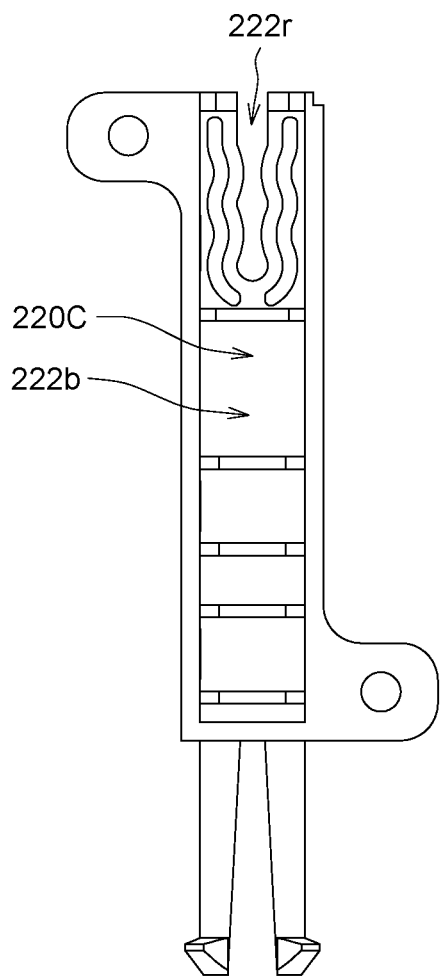
FIG. 4E is a rear view of a first limiting member according to an embodiment of the present invention.
Figure 4F:
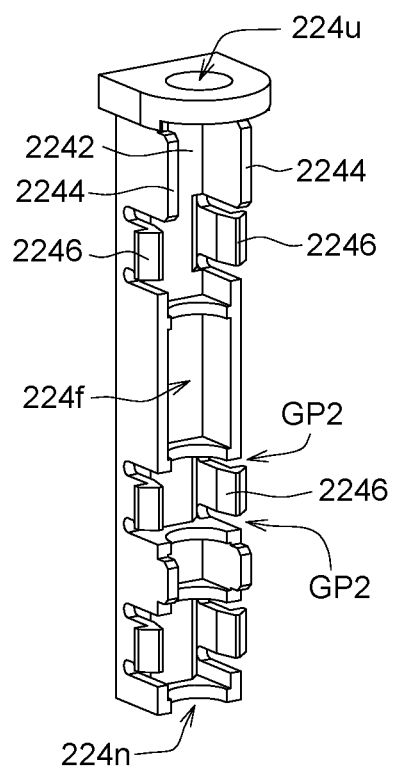
FIG. 4F is a schematic diagram of a second limiting member according to an embodiment of the present invention.
Figure 5A:
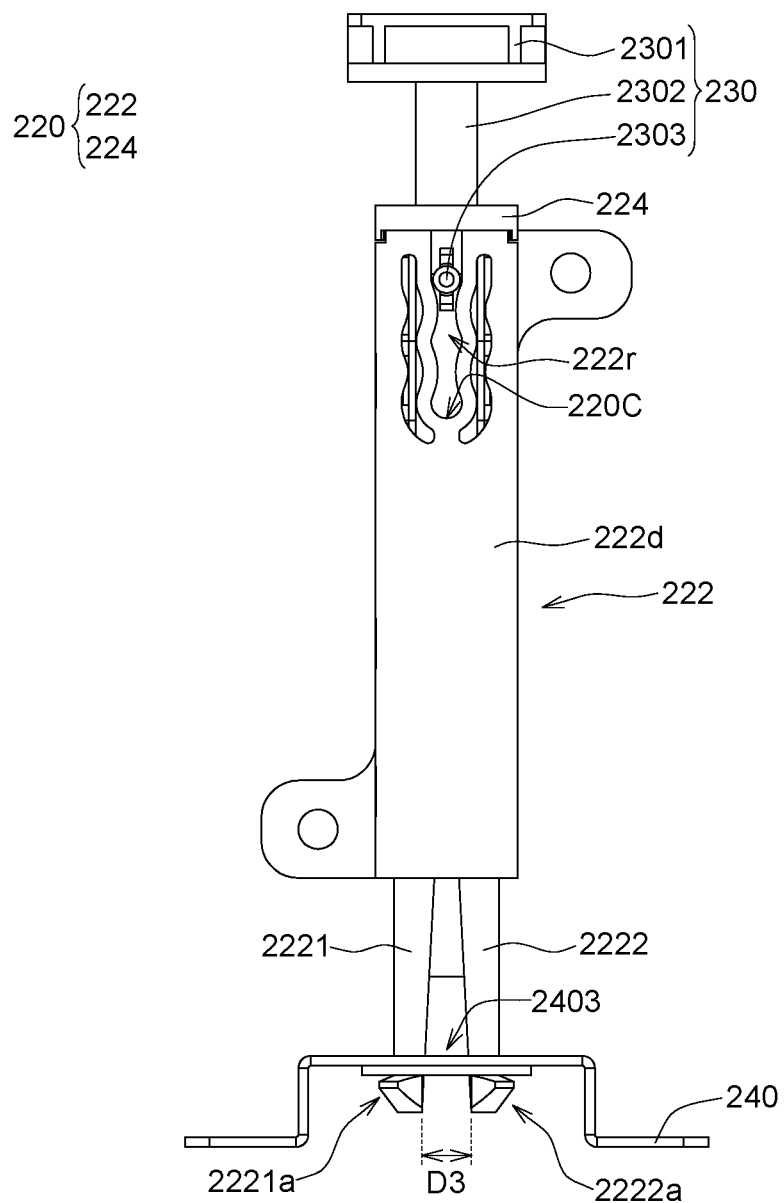
FIGS. 5A~5B are schematic diagrams of a fixing device engaged with a counter member according to an embodiment of the present invention.
Figure 5B:
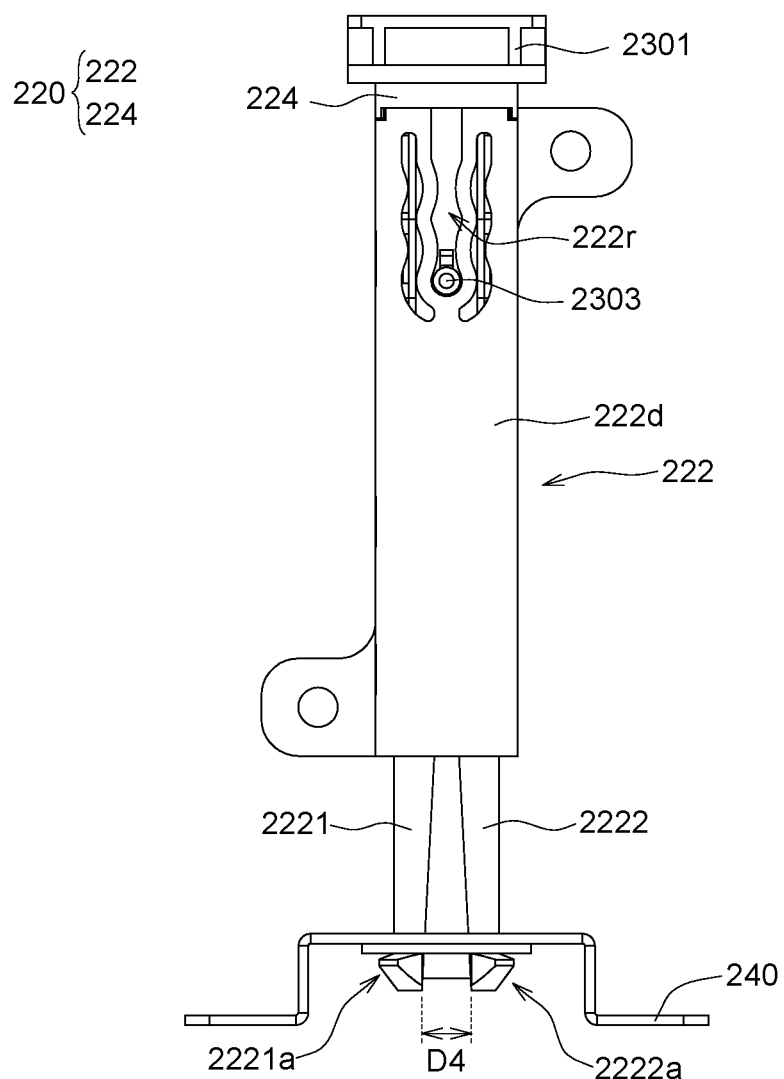

FIG. 4A is a front view of a fixing device 20 according to an embodiment of the present invention. FIG. 4B is an explosion diagram of a fixing device 20 according to an embodiment of the present invention. FIG. 4C is a left side view of a first limiting member 222 according to an embodiment of the present invention. FIG. 4D is a right side view of a first limiting member 222 according to an embodiment of the present invention. FIG. 4E is a rear view of a first limiting member 222 according to an embodiment of the present invention. FIG. 4F is a schematic diagram of a second limiting member 224 according to an embodiment of the present invention. FIGS. 5A~5B are schematic diagrams of a fixing device 20 engaged with a counter member 240 according to an embodiment of the present invention.

Referring to FIGS. 4A~4B, the fixing device 20 includes a limiting structure 220 and a movement portion 230. The limiting structure 220 is extended along a first direction (such as Z direction) and has an accommodation space 220C and at least one pair of hooks 2221a and 2222a. The hooks 2221a and 2222a are engaged with a counter member 240. Furthermore, the limiting structure 220 includes a first limiting member 222 and a second limiting member 224. In some embodiments, the limiting structure 220 (including a first limiting member 222 and a second limiting member 224) and the movement portion 230 can be formed of plastics, reinforced plastics or other suitable materials.

Referring to FIGS. 4A~4E, the first limiting member 222 can be realized by, for example, a sleeve-shaped housing structure. The first limiting member 222 includes an upper end opening 222u, a lower end opening 222n and a rear side opening 222b. The lower end opening 222n is opposite to the upper end opening 222u. The rear side opening 222b is interconnected with the upper end opening 222u, the lower end opening 222n and the accommodation space 220C. The first limiting member 222 includes a main portion 222d and is connected to a first structure 2221 and a second structure 2222 of the main portion 222d. The lower portion of the limiting structure 220 corresponds to the lower portion of the first limiting member 222 and includes a first structure 2221 and a second structure 2222. The first structure 2221 and the second structure 2222 correspond to the lower end opening 222n, and a gap GP1 is formed between the first structure 2221 and the second structure 2222. In an embodiment, the size of the gap GP1 in the second direction (such as X direction) can be adjusted by applying an external force to the first structure 2221 and the second structure 2222. A pair of hooks 2221a and 2222a can be formed on the bottom of the first limiting member 222 (that is, the bottoms of the first structure 2221 and the second structure 2222). For example, the bottoms of the first structure 2221 and the second structure 2222 are extended in opposite directions parallel to the second direction to form the hooks 2221a and 2222a.

A positioning groove 222r, formed at the upper portion of the first limiting member 222 and interconnected with the upper end opening 222u, has an S-shaped appearance and is configured to accommodate the protruded portion 2303 of the movement portion 230 (details are disclosed below) to position the movement portion 230. Different portions of the positioning groove 222r have different widths in the second direction (such as X direction). For example, the positioning groove 222r includes several interlaced first portions and second portions. The width WI of the first portion of the positioning groove 222r in the second direction can be equal to or greater than the width of the protruded portion 2303 in the second direction; the width WII of the second portion of the positioning groove 222r in the second direction can be smaller than the width of the protruded portion 2303 in the second direction. In the present embodiment, the first limiting member 222 further includes two slits 222v1 and 222v2 adjacent to the positioning groove 222r (as indicated in FIG. 4B). The slits 222v1 and 222v2 have an S-shaped appearance. However, the present invention is not limited thereto, and the quantity of slits can be 1 or greater than 2, and the appearance of the slits 222v1 and 222v2 can be designed to fit actual needs. For example, the slits 222v1 and 222v2 are disposed on two opposite sides of the positioning groove 222r to provide space and flexibility to the augmentation of the positioning groove 222r. Several side through holes 222v are formed on two sides of the first limiting member 222 (FIG. 4C) and are mutually fixed with the second limiting member 224 (details are disclosed below). In some embodiments, the main portion 222d of the first limiting member 222 can be connected to the locking portions 222x fixed on a plate structure (not illustrated) parallel to the first direction and the second direction. In the present embodiment, the locking portions 222x have a quantity of 2 and are separated in the second direction. However, the present invention is not limited thereto, and the locking portions 222x can have a quantity greater than 2 and can be overlapped in the second direction.

Referring to FIGS. 4A~4C and FIG. 4F, the second limiting member 224 includes an upper end hole 224u, a lower end hole 224n, a front side opening 224f, a rear side housing 2242, a plurality of side housings 2244 and a plurality of fixing mechanisms 2246. The lower end hole 224n is opposite to the upper end hole 224u. The front side opening 224f is interconnected with the upper end hole 224u. The side housings 2244 are connected to the rear side housing 2242. The fixing mechanisms 2246 are connected to the rear side housing 2242, wherein the fixing mechanisms 2246 and the side housings 2244 are stacked in the first direction, and a gap GP2 is formed between the fixing mechanism 2246 and the side housing 2244 (for example, both the top and the bottom of the fixing mechanism 2246 are separated from the side housing 2244) to provide a larger space to the fixing mechanisms 2246. The side through holes 222v of the first limiting member 222 correspond to the fixing mechanisms 2246, and as the fixing mechanisms 2246 respectively are engaged with the side through holes 222v of the first limiting member 222, the first limiting member 222 and the second limiting member 224 are assembled and mutually fixed and together surround the accommodation space 220C. In the present embodiment, the fixing mechanisms 2246 have a quantity of 6, the side through holes 222v have a quantity of 6, and the fixing mechanisms 2246 and the side through holes 222v are arranged in a symmetric manner, but the present invention is not limited thereto. In other embodiments, the fixing mechanisms 2246 can have a quantity of 2 or greater than 2, the side through holes 222v can have a quantity of 2 or greater than 2, and the fixing mechanisms 2246 and the side through holes 222v do not need to be arranged in a symmetric manner.

The movement portion 230 includes an expanded portion 2301, a rod portion 2302 and a protruded portion 2303. The rod portion 2302 is connected to the expanded portion 2301 and passes through the accommodation space 220C along the first direction. The width W2301 of the expanded portion 2301 in the second direction is greater than the width W2302 of the rod portion 2302 in the second direction and is greater than the width W222 of the main portion 222d of the first limiting member 222 in the second direction. In the present embodiment, the expanded portion 2301 has a cap appearance. However, the present invention is not limited thereto, and the expanded portion 2301 can have a disc shape or other suitable shape for the user to conveniently apply a force to the movement portion 230. The protruded portion 2303 is disposed on the rod portion 2302, such as protruded forward (or outward) from the rod portion 2302. The protruded portion 2303 corresponds to the positioning groove 222r. As the protruded portion 2303 and the positioning groove 222r are mutually engaged, the movement portion 230 and the first limiting member 222 are mutually fixed.

In some embodiments, a top through hole 2403 is formed on the counter member 240, and as the bottoms of the movement portion 230 and the first limiting member 222 can pass through the top through hole 2403, the hooks 2221a and 2222a of the first limiting member 222 are engaged with the counter member 240.

The movement portion 230 can move relative to the limiting structure 220 (includes the first limiting member 222 and the second limiting member 224) or the counter member 240. When the bottom of the movement portion 230 abuts on the hooks 2221a and 2222a, a first distance D3 is formed between the hooks 2221a and 2222a as indicated in FIG. 5A. Meanwhile, the expanded portion 2301 is separated from the second limiting portion 224, the protruded portion 2303 is engaged at the first position of the positioning groove 222r, the bottom of the first limiting member 222 (that is, the bottoms of the first structure 2221 and the second structure 2222) passes through the top through hole 2403. Then, the movement portion 230 is moved towards the counter member 240 (such as downwards), the two sides of the rod portion 2302 of the movement portion 230 abut on the first structure 2221 and the second structure 2222 to provide a supporting force parallel to the second direction (such as X direction) for enabling the hooks 2221a and 2222a to be firmly engaged with the counter member 240 and not to come off easily as indicated in FIG. 5B. When the bottom of the movement portion 230 overlaps the hooks 2221a and 2222a in the second direction (the rod portion 2302 of the movement portion 230 also passes through the top through hole 2403), a second distance D4 is formed between the hooks 2221a and 2222a, wherein the second distance D4 is greater than the first distance D3. Meanwhile, the expanded portion 2301 contacts the second limiting portion 224 (the present invention is not limited thereto), the protruded portion 2303 is engaged at the second position of the positioning groove 222r, and the second position at which the protruded portion 2303 is disposed is farther away from the upper end opening 222u than the first position.

In some embodiments, the back of the first limiting member 222, such as a planar housing, is fixed on a first plate structure (not illustrated), and the bottom of the counter member 240 is fixed on a second plate structure (not illustrated). When the movement portion 230 is moved downwards, the hooks 2221a and 2222a are firmly engaged with the counter member 240 and the first plate structure and the second plate structure are mutually fixed, wherein the first plate structure is perpendicular to the second plate structure.

In the present embodiment, the cross-section of the limiting structure 220 (such as the plane formed by X direction and Y direction) is similar to a semi-circle, and the cross-section of the top through hole 2403 is a circle, but the present invention is not limited thereto. In other embodiments, the cross-section of the limiting structure 220 can be a circle, a square, a triangle or a polygon. The cross-section of the top through hole 2403 can be a square, a triangle or a polygon. The shape of the cross-section of the limiting structure 220 corresponds to the shape of the cross-section of the top through hole 2403.

Figure 6A:
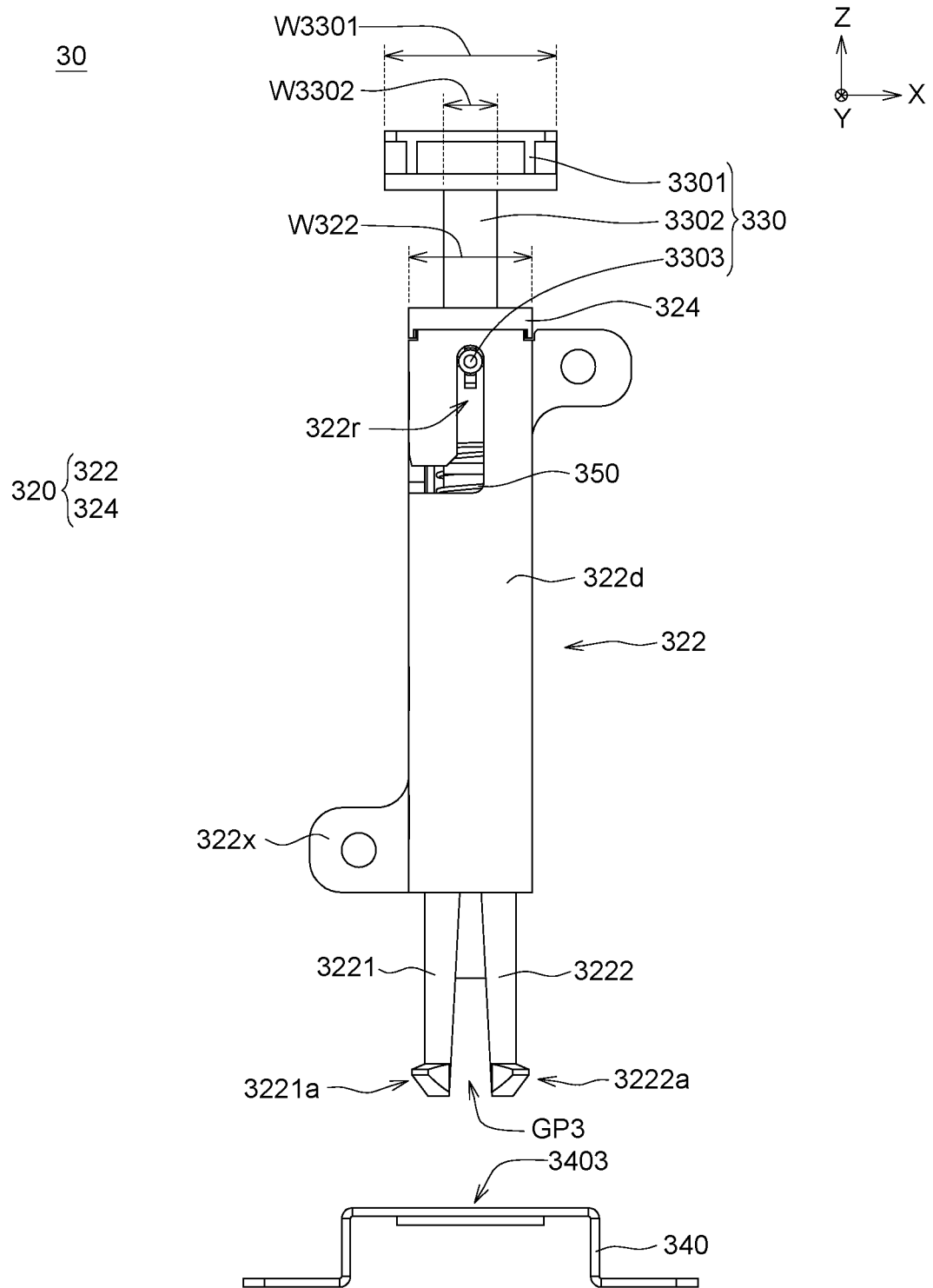
FIG. 6A is a front view of a fixing device according to an embodiment of the present invention.
Figure 6B:
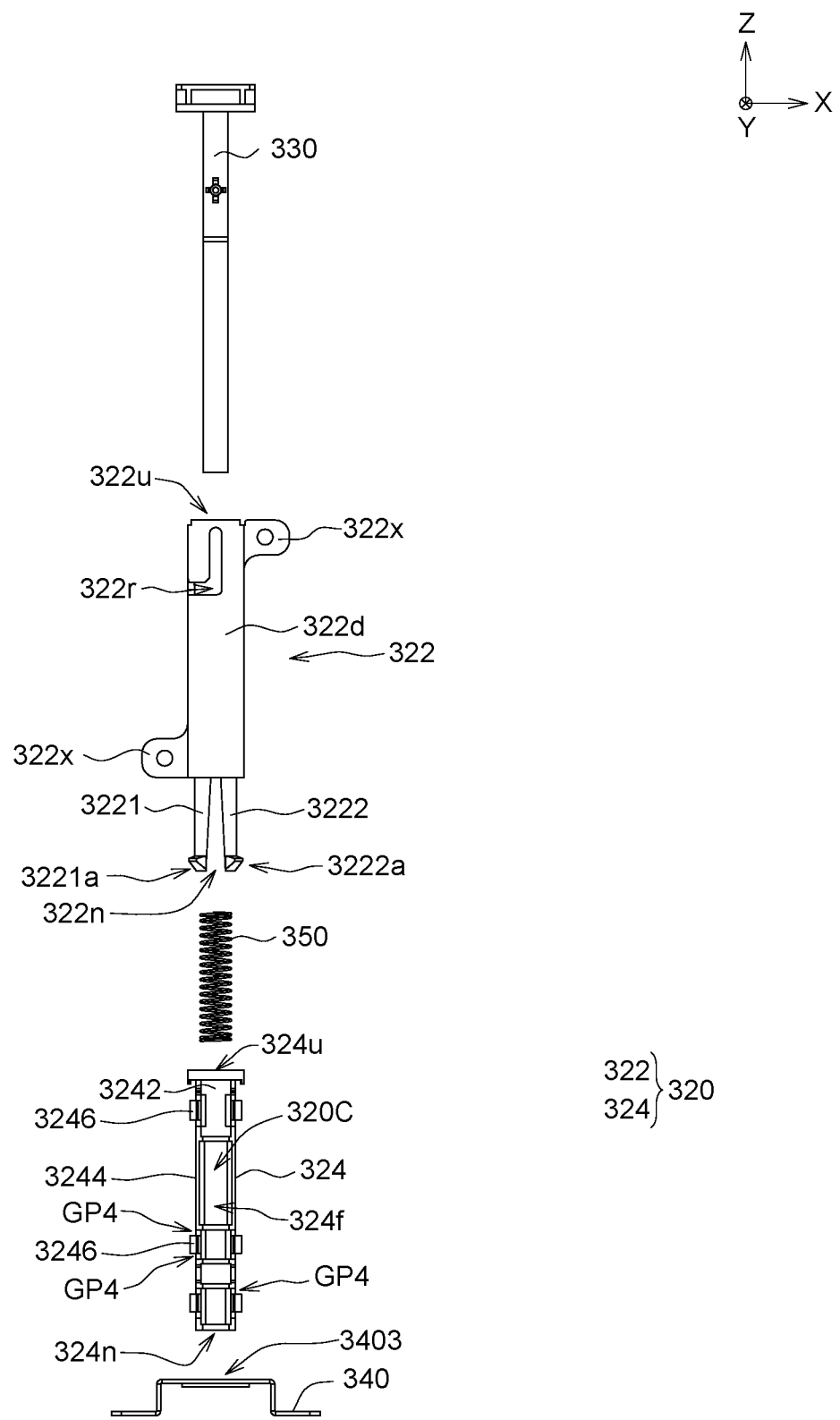
FIG. 6B is an explosion diagram of a fixing device according to an embodiment of the present invention.
Figure 7A:
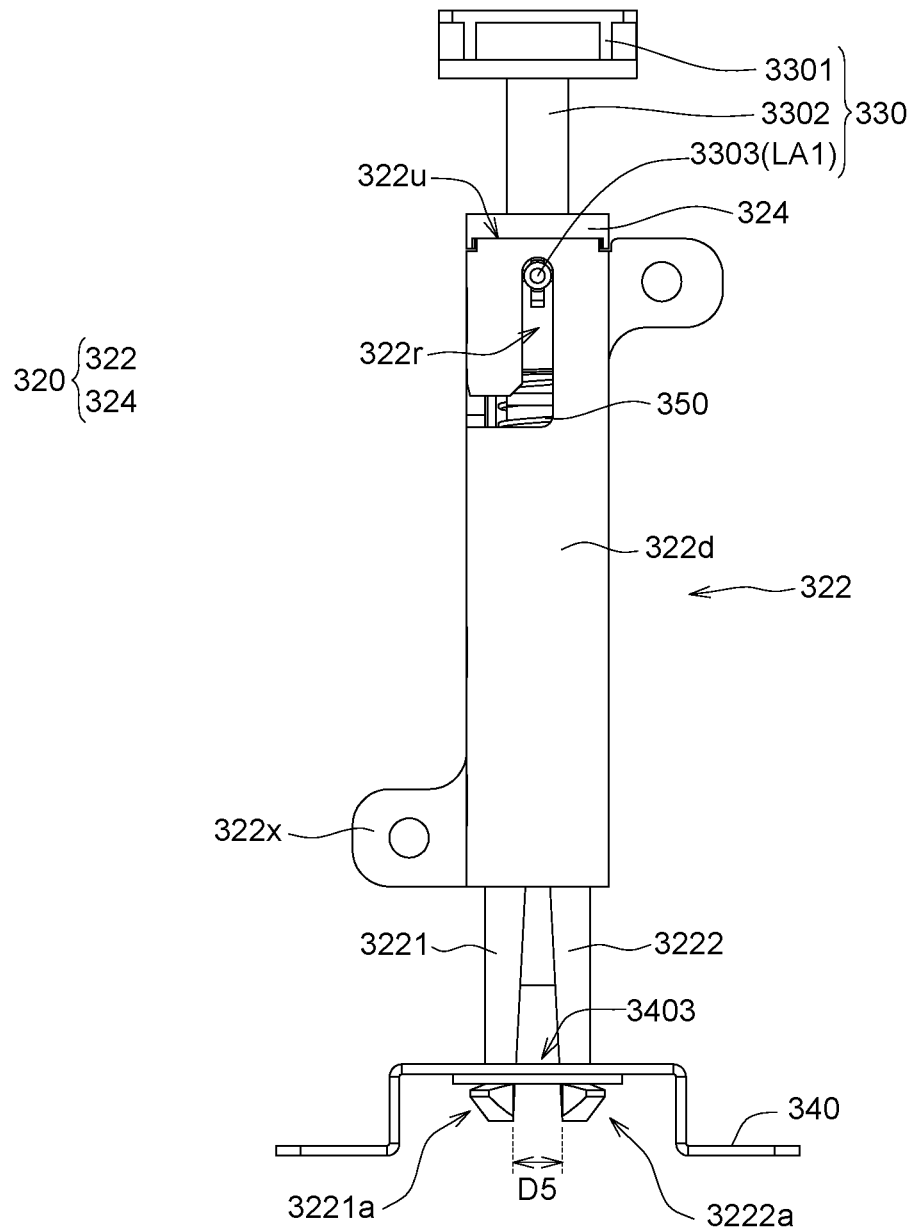
FIGS. 7A~7D are schematic diagrams of a fixing device engaged with a counter member according to an embodiment of the present invention.
Figure 7B:
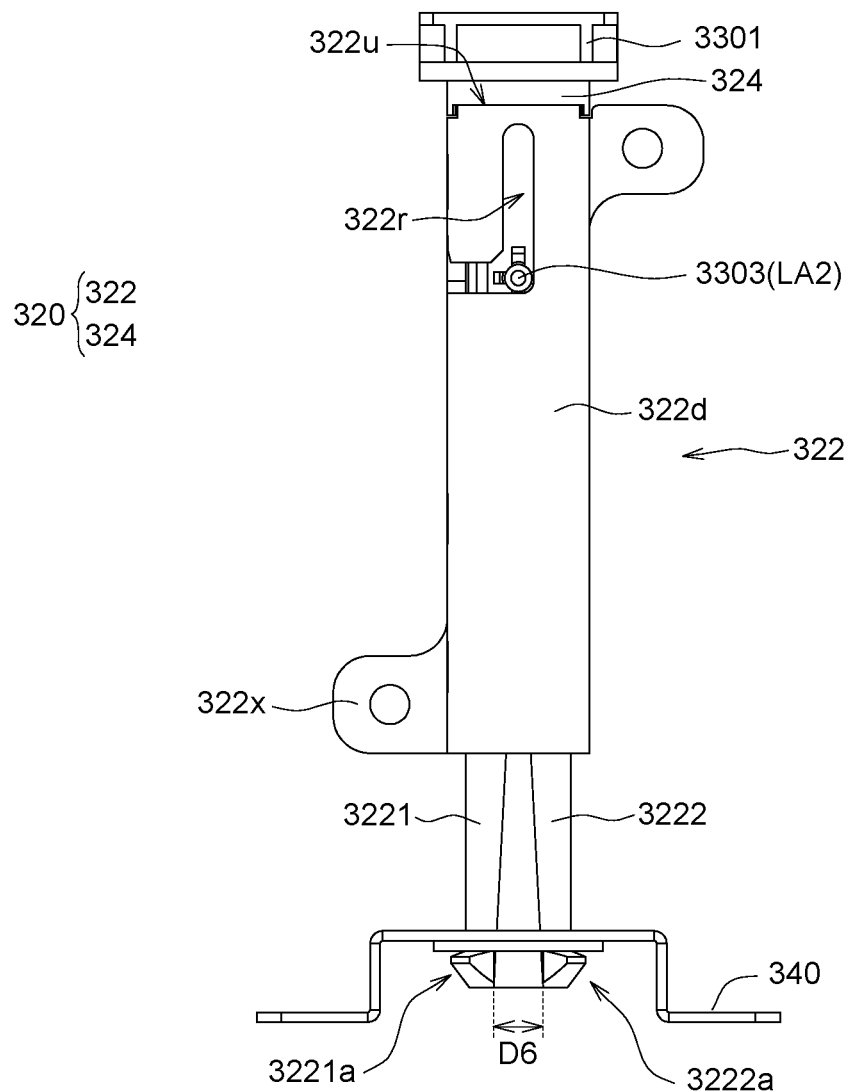
Figure 7C:
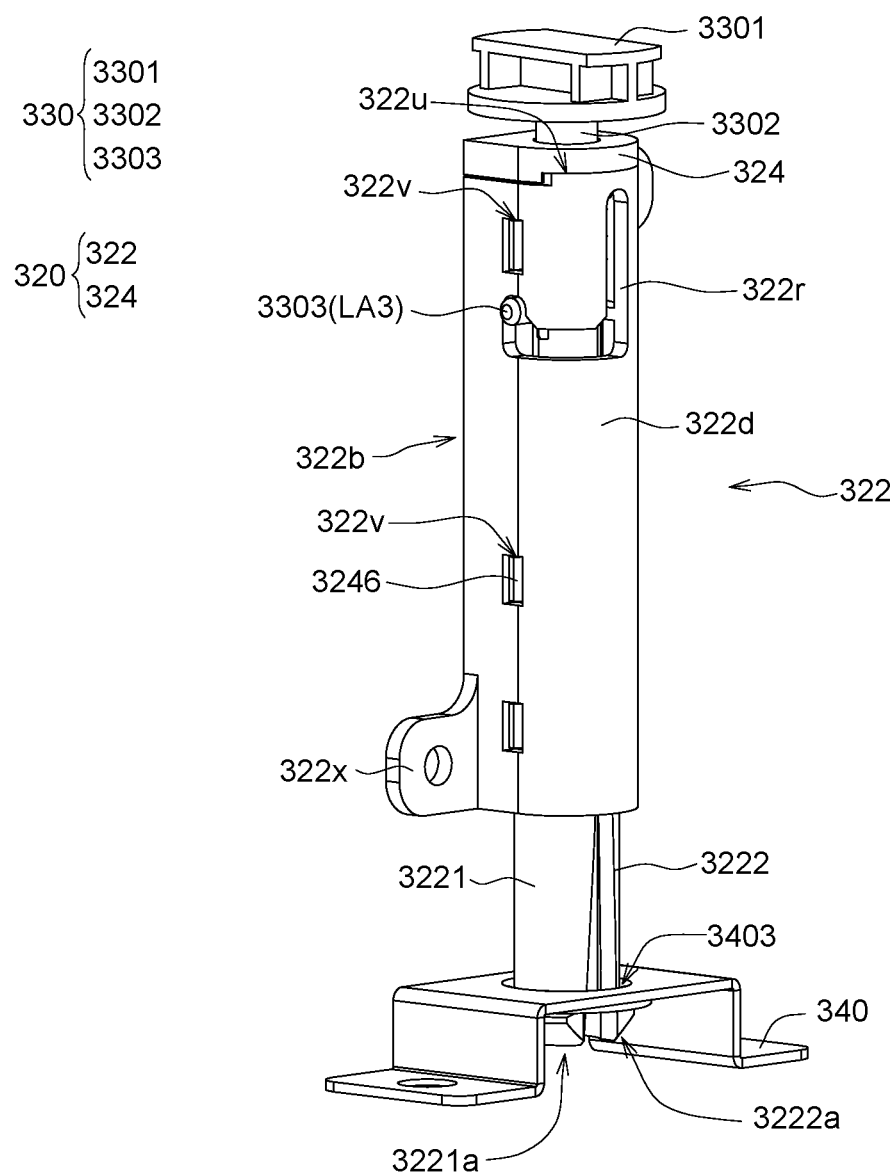
Figure 7D:
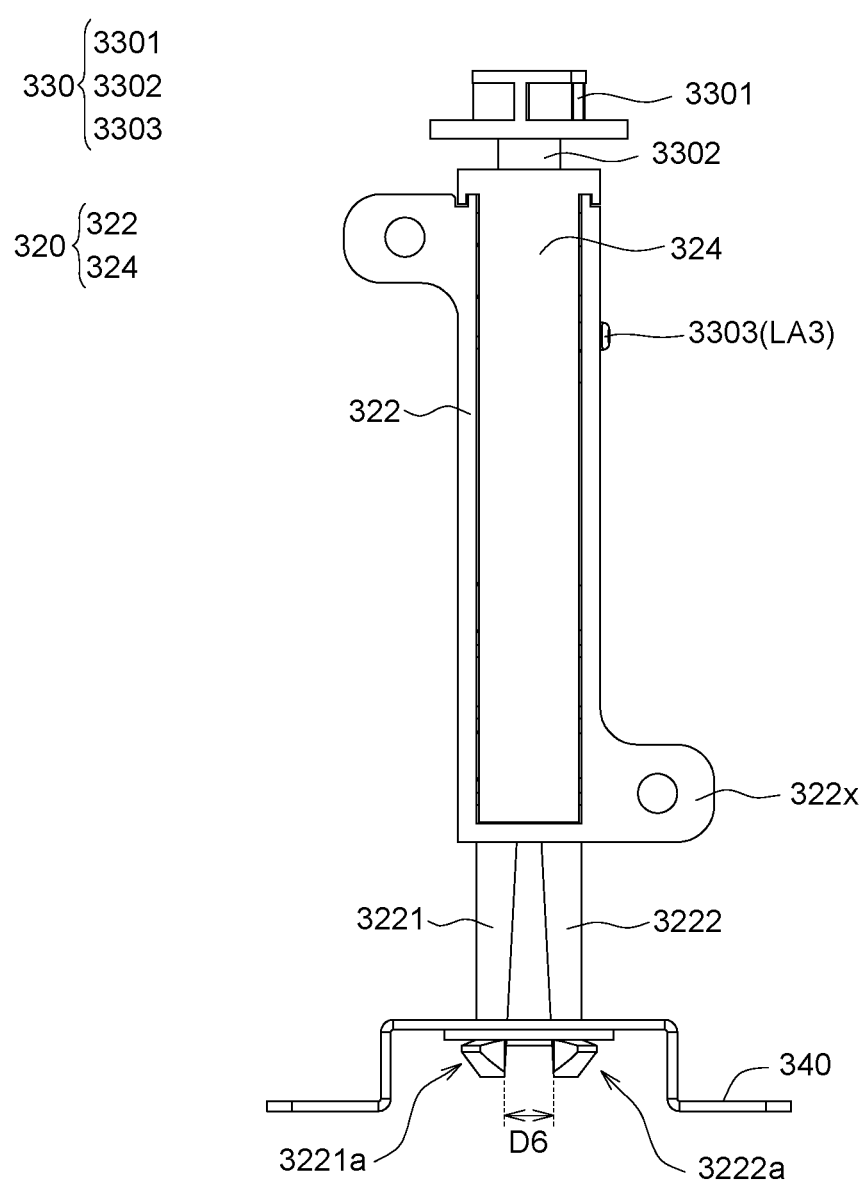
Figure 8A:
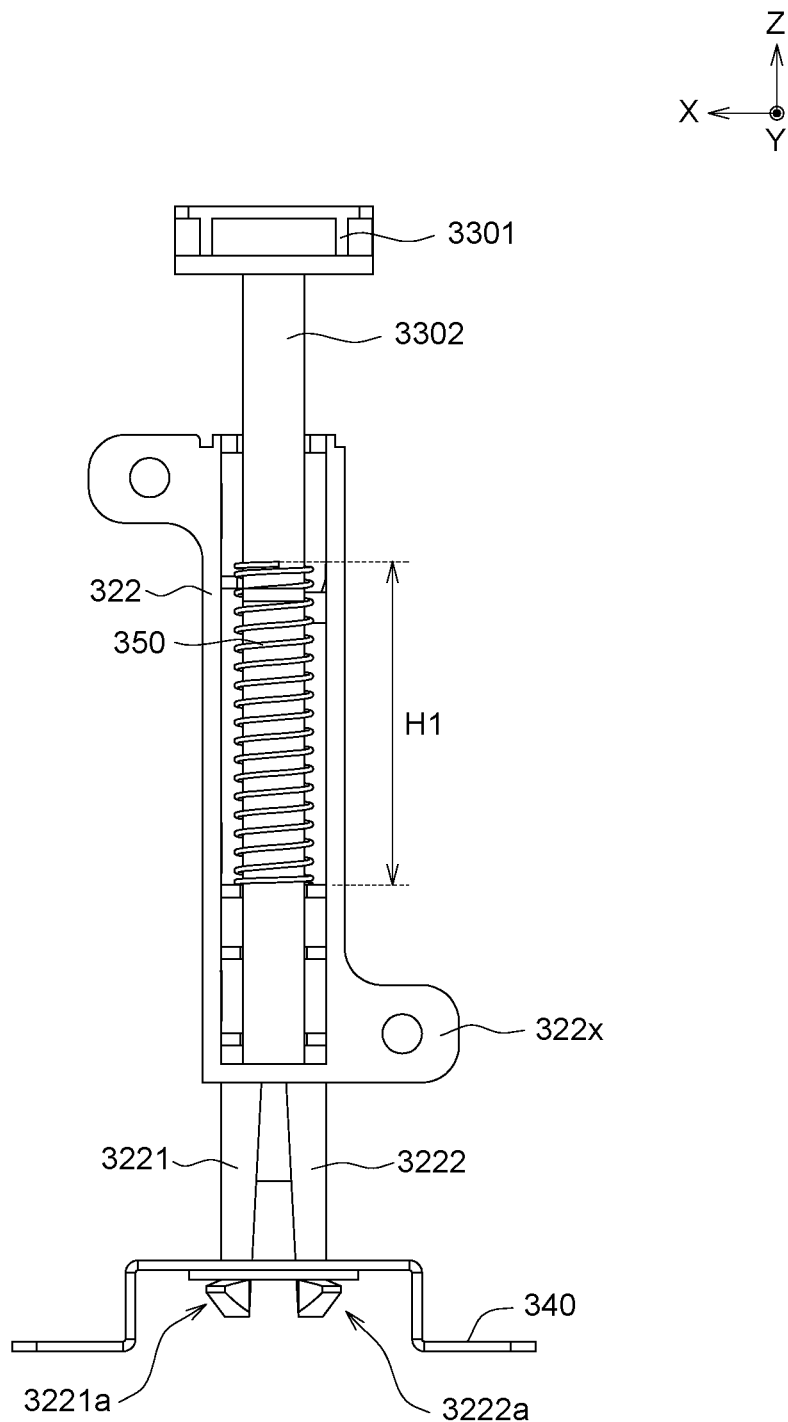
FIGS. 8A~8C are rear views of a fixing device engaged with a counter member (omitting the second limiting member) according to an embodiment of the present invention.
Figure 8B:
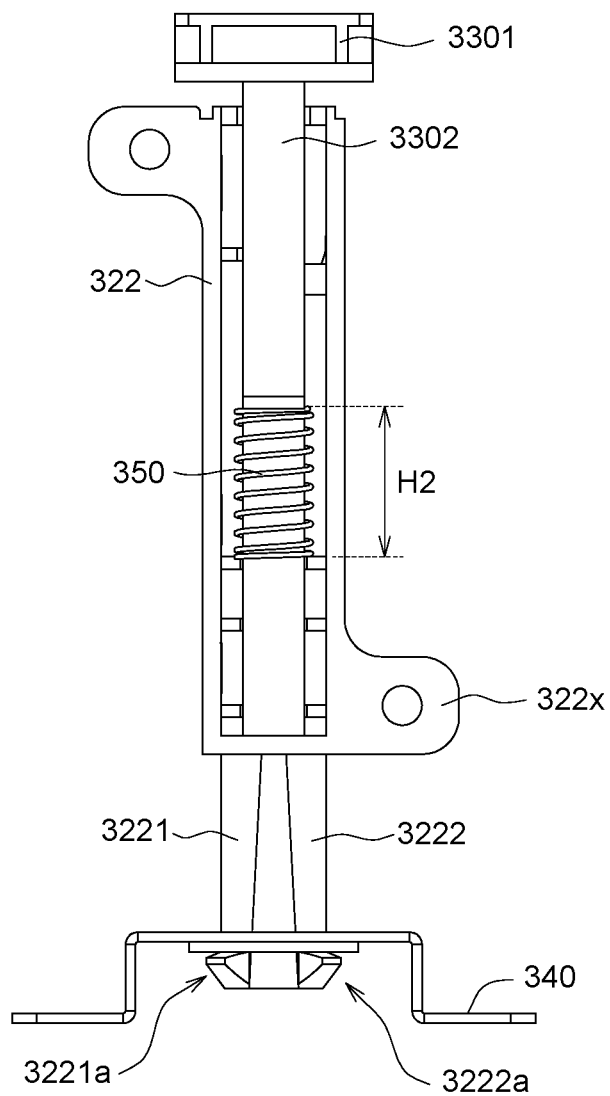
Figure 8C:
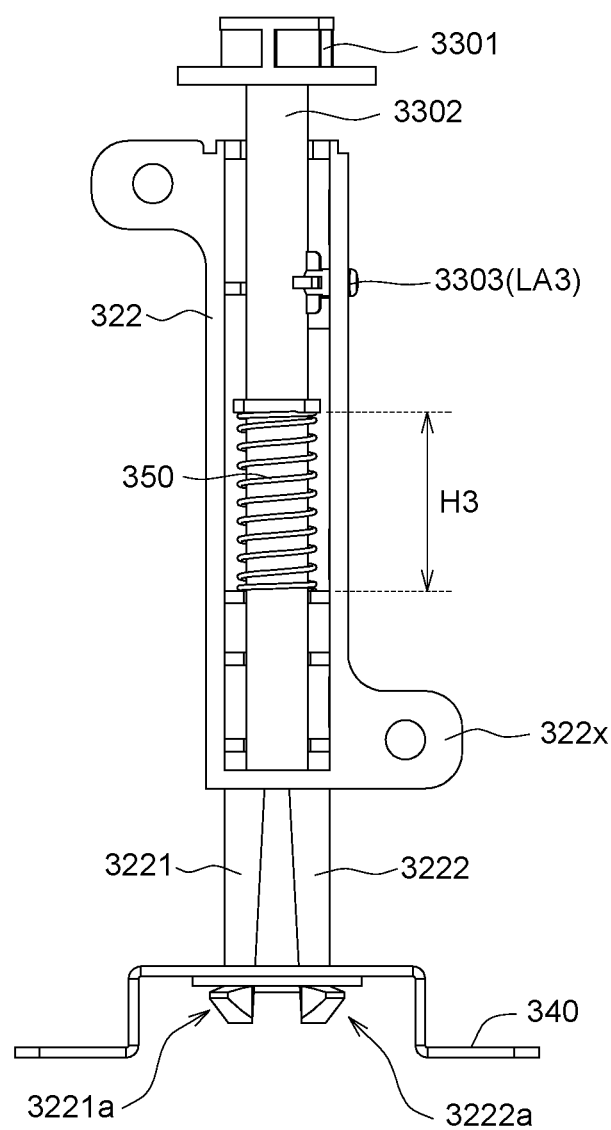

FIG. 6A is a front view of a fixing device 30 according to an embodiment of the present invention. FIG. 6B is an explosion diagram of a fixing device 30 according to an embodiment of the present invention. FIGS. 7A~7D are schematic diagrams of a fixing device 30 engaged with a counter member 340 according to an embodiment of the present invention. FIGS. 7A~7B are front views of a fixing device 30 engaged with a counter member 340. FIG. 7C is a left side view of a fixing device 30 engaged with a counter member 340. FIG. 7D is a rear view of a fixing device 30 engaged with a counter member 340. FIGS. 8A~8C are rear views of a fixing device 30 engaged with a counter member 340 (omitting the second limiting member 324) according to an embodiment of the present invention. FIGS. 9A~9D are different forms of positioning groove 322r.

Referring to FIGS. 6A~6B, the fixing device 30 includes a limiting structure 320, a movement portion 330 and a spring structure 350. The limiting structure 320 is extended along a first direction (such as Z direction) and has an accommodation space 320C and at least one pair of hooks 3221a and 3222a. The hooks 3221a and 3222a are engaged with a counter member 340. Furthermore, the limiting structure 320 includes a first limiting member 322 and a second limiting member 324. In some embodiments, the limiting structure 320 (including the first limiting member 322 and the second limiting member 324) and the movement portion 330 can be formed of plastics, reinforced plastics or other suitable materials.

The first limiting member 322, which can be a sleeve-shaped housing structure, includes an upper end opening 322u, a lower end opening 322n and a rear side opening 322b (illustrated in FIG. 7C). The lower end opening 322n is opposite to the upper end opening 322u. The rear side opening 322b is interconnected with the upper end opening 322u, the lower end opening 322n and the accommodation space 320C. The first limiting member 322 includes a main portion 322d and is connected to a first structure 3221 and a second structure 3222 of the main portion 322d. The lower portion of the limiting structure 320 corresponds to the lower portion of the first limiting member 322 and includes a first structure 3221 and a second structure 3222, wherein the first structure 3221 and the second structure 3222 correspond to the lower end opening 322n, and a gap GP3 is formed between the first structure 3221 and the second structure 3222. In an embodiment, the size of the gap GP3 in the second direction (such as the X direction) can be adjusted by applying an external force to the first structure 3221 and the second structure 3222. A pair of hooks 3221a and 3222a are formed on the bottom of the first limiting member 322 (that is, the bottoms of the first structure 3221 and the second structure 3222). For example, the bottoms of the first structure 3221 and the second structure 3222 are extended in opposite directions parallel to the second direction to form the hooks 3221a and 3222a.

Figure 9A:
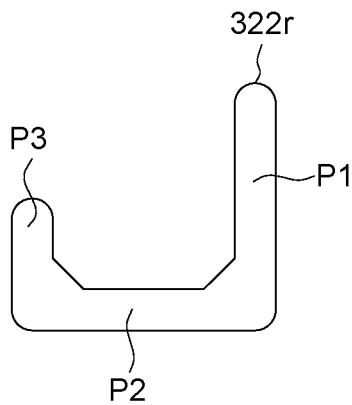
FIGS. 9A~9D are different forms of positioning groove.
Figure 9B:
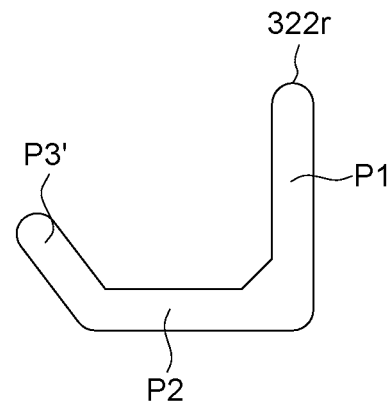
Figure 9C:
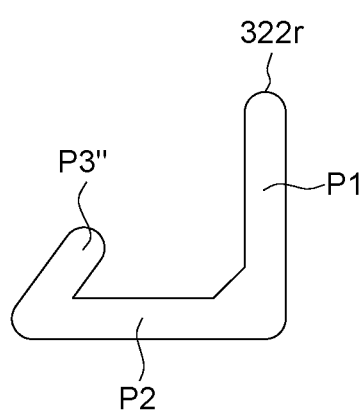
Figure 9D:
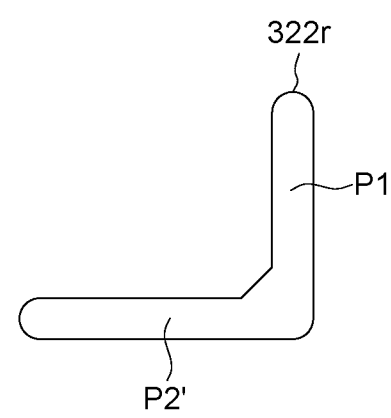

A positioning groove 322r, formed on the first limiting member 322 and adjacent to the upper end opening 322u, is configured to accommodate the protruded portion 3303 of the movement portion 330 (details are disclosed below) to position the movement portion 330. The protruded portion 3303 of the movement portion 330 can move freely in the positioning groove 322r. Referring to FIGS. 9A~9C, in some embodiments, the positioning groove 322r includes a first portion P1, a second portion P2 and a third portion P3, P3' or P3", and the extending direction of the first portion P1 is different from the extending direction of the second portion P2, and the extending direction of the third portion P3, P3' or P3" is intersected with the extending direction of the second portion P2. The extending direction of the first portion P1 of the positioning groove 322r is parallel to the extending direction of the third portion P3 as indicated in FIG. 9A. The extending direction of the first portion P1 of the positioning groove 322r is intersected with the extending direction of the third portion P3' or P3" as indicated in FIGS. 9B~9C. In some embodiments as indicated in FIG. 9D, the positioning groove 322r includes a first portion P1 and a second portion P2', but does not have a third portion, wherein the length of the second portion P2' can be greater than the length of the second portion P2. The third portion P3' or P3" and the extended second portion P2' are configured to avoid the protruded portion 3303 coming off the positioning groove 322r and make the movement portion 330 more firmly positioned. However, the positioning groove 322r of the present invention is not limited to the above exemplifications and any shape of the positioning groove 322r which avoids the protruded portion 3303 coming off the positioning groove 322r can be included in the present application.

As indicated in FIG. 7A~7D, several side through holes 322v are formed on the two sides of the first limiting member 322 and are mutually fixed with the second limiting member 324 (details are disclosed below). In some embodiments, the main portion 322d of the first limiting member 322 can be connected to the locking portions 322x fixed on a plate structure (not illustrated). In the present embodiment, the locking portions 322x have a quantity of 2 and are separated in the second direction. However, the present invention is not limited thereto, and the locking portions 322x can have a quantity greater than 2 and can be overlapped in the second direction.

The second limiting member 324 includes an upper end hole 324u, a lower end hole 324n, a front side opening 324f, a rear side housing 3242 (as indicated in FIG. 6B), a plurality of side housings 3244 and a plurality of fixing mechanisms 3246. The lower end hole 324n is opposite to the upper end hole 324u. The front side opening 324f is interconnected with the upper end hole 324u. The side housings 3244 are connected to the rear side housing 3242. The fixing mechanisms 3246 are connected to the rear side housing 3242, wherein the fixing mechanisms 3246 and the side housings 3244 are stacked in the first direction, and a gap GP4 is formed between the fixing mechanism 3246 and the side housing 3244 (for example, both the top and the bottom of the fixing mechanism 3246 are separated from the side housings 3244) to provide a larger space to the fixing mechanisms 3246. The side through holes 322v of the first limiting member 322 (illustrated in FIG. 7C) correspond to the fixing mechanisms 3246, and as the fixing mechanisms 3246 respectively are engaged with the side through holes 322v of the first limiting member 322, the first limiting member 322 and the second limiting member 324 are assembled and mutually fixed, and the first limiting member 322 and the second limiting member 324 together surround the accommodation space 320C. In the present embodiment, the fixing mechanisms 3246 have a quantity of 6, the side through holes 322v have a quantity of 6 and the fixing mechanisms 3246, and the side through holes 322v are symmetric in a left and right manner, but the present invention is not limited thereto. In other embodiments, the fixing mechanisms 3246 can have a quantity of 2 or greater than 2, the side through holes 322v can have a quantity of 2 or greater than 2 and the fixing mechanisms 3246, and the side through holes 322v do not need to be arranged in a symmetric manner.

The movement portion 330 includes an expanded portion 3301, a rod portion 3302 and a protruded portion 3303. The rod portion 3302 is connected to the expanded portion 3301 and passes through the accommodation space 320C along the first direction. The width W3301 of the expanded portion 3301 in the second direction is greater than the width W3302 of the rod portion 3302 in the second direction and is greater than the width W322 of the main portion 322d of the first limiting member 322 in the second direction. In the present embodiment, the expanded portion 3301 has a cap appearance. However, the present invention is not limited thereto, and the expanded portion 3301 can have a disc shape or other suitable shape for the user to conveniently apply a force to the movement portion 330. The protruded portion 3303 is disposed on the rod portion 3302, such as protruded forward (or outward) from the rod portion 3302. The protruded portion 3303 corresponds to the positioning groove 322r. As the protruded portion 3303 and the positioning groove 322r are mutually engaged, the movement portion 330 and the first limiting member 322 are mutually fixed.

The spring structure 350, disposed in the accommodation space 320C and under the protruded portion 3303, surrounds the rod portion 3302 and enables the movement portion 320 to perform reciprocal movement along an axis parallel to the first direction.

In some embodiments, the counter member 340 has a top through hole 3403, and as the bottoms of the movement portion 330 and the first limiting member 322 may pass through the top through hole 3403, the hooks 3221a and 3222a of the first limiting member 322 are engaged with the counter member 340.

The movement portion 330 can move relative to the limiting structure 320 (including the first limiting member 322 and the second limiting member 324) or the counter member 340. When the bottom of the movement portion 330 is disposed above the hooks 3221a and 3222a, a first distance D5 is formed between the hooks 3221a and 3222a as indicated in FIG. 7A. Meanwhile, the expanded portion 3301 is separated from the second limiting portion 324, the protruded portion 3303 is disposed at the first position LA1 of the positioning groove 322r, the bottom of the first limiting member 322 (that is, the bottoms of the first structure 3221 and the second structure 3222) may pass through the top through hole 3403. The state of the spring structure 350 of FIG. 7A is illustrated in FIG. 8A. As indicated in FIG. 8A, the spring structure 350 is not compressed and has a first height H1 in the first direction. Then, the movement portion 330 is moved towards the counter member 340 (such as downwards) and the two sides of the rod portion 3302 of the movement portion 330 abut on the first structure 3221 and the second structure 3222. Meanwhile, when the bottom of the movement portion 330 overlaps with the hooks 3221a and 3222a in the second direction (the rod portion 3302 of the movement portion 330 also passes through the top through hole 3403), a second distance D6 is formed between the hooks 3221a and 3222a as indicated in FIG. 7B, wherein the second distance D6 is greater than the first distance D5. Meanwhile, the expanded portion 3301 contacts the second limiting portion 324 (the present invention is not limited thereto), the protruded portion 3303 is engaged at the second position LA2 of the positioning groove 322r, and the second position LA2 at which the protruded portion 3303 is disposed is farther away from the upper end opening 322u than the first position LA1. The state of the spring structure 350 of FIG. 7B is illustrated in FIG. 8B. As indicated in FIG. 8B, the spring structure 350 is compressed and has a second height H2 in the first direction. Then, as the movement portion 330 is rotated and drives the protruded portion 3303 to slide along the second portion P2 in accordance with the shape of the positioning groove 322r and rebound upwards to the third portion P3, the protruded portion 3303 is engaged at the third position LA3 as indicated in FIGS. 7C~7D. The third position LA3 at which the protruded portion 3303 is disposed is closer to the upper end opening 322u than the second position LA2. The state of the spring structure 350 of FIGS. 7C~7D is illustrated in FIG. 8C. As indicated in FIG. 8C, the spring structure 350 slightly rebounds and has a third height H3 in the first direction. The third height H3 of the spring structure 350 is greater than the second height H2 and is smaller than the first height H1. As indicated in FIGS. 7C~7D and FIG. 8C, the bottom of the rod portion 3302 provides a supporting force parallel to the second direction (such as the X direction) for enabling the hooks 3221a and 3222a to be firmly engaged with the counter member 340 and not to come off easily. When the bottom of the movement portion 330 overlaps the hooks 3221a and 3222a in the second direction (the rod portion 3302 of the movement portion 330 passes through the top through hole 3403), the second distance D6 is maintained between the hooks 3221a and 3222a. Meanwhile, the expanded portion 3301 contacts the second limiting portion 324 (the present invention is not limited thereto).

In some embodiments, the back of the first limiting member 322, such as a planar housing, is fixed on a first plate structure (not illustrated), and the bottom of the counter member 340 is fixed on a second plate structure (not illustrated). When the movement portion 330 is moved downwards, the hooks 3221a and 3222a are firmly engaged with the counter member 340, and the first plate structure and the second plate structure are mutually fixed, wherein the first plate structure is perpendicular to the second plate structure.

In the present embodiment, the cross-section of the limiting structure 320 (such as the plane formed by X direction and Y direction) is similar to a semi-circle, and the cross-section of the top through hole 3403 is a circle, but the present invention is not limited thereto. In other embodiments, the cross-section of the limiting structure 320 can be a circle, a square, a triangle or a polygon. The cross-section of the top through hole 3403 can be a square, a triangle or a polygon.

According to an embodiment of the present invention, a fixing device is provided. The fixing device includes a limiting structure and a movement portion. The limiting structure is extended along a first direction and has an accommodation space and at least one pair of hooks disposed at a terminal end of the limiting structure. The extending directions of the at least one pair of hooks are opposite to each other and respectively are parallel to a second direction perpendicular to the first direction. The movement portion is disposed in the accommodation space and moves relative to the limiting structure. When a bottom of the movement portion is disposed above the at least one pair of hooks, a first distance is formed between the at least one pair of hooks in the second direction. When the bottom of the movement portion overlaps the at least one pair of hooks in the second direction, a second distance greater than the first distance is formed between the at least one pair of hooks in the second direction.

The fixing device of the present invention includes a limiting structure and a movement portion. A pair of hooks are formed at the terminal end of the limiting structure. When the movement portion moves relative to the limiting structure, the distance between the hooks can be adjusted through the movement portion, such that the two plate structures connected to the fixing device can be easily separated from each other or can be mutually fixed without using several screws or plugs.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A fixing device comprising:
   a limiting structure extended along a first direction and having an accommodation space and at least one pair of hooks disposed at a terminal end of the limiting structure, wherein extending directions of the at least one pair of hooks are opposite to each other and respectively are parallel to a second direction perpendicular to the first direction; and
   a movement portion disposed in the accommodation space and configured to move relative to the limiting structure;
   when a bottom of the movement portion is disposed above the at least one pair of hooks, the at least one pair of hooks has a first distance therebetween in the second direction; when the bottom of the movement portion overlaps the at least one pair of hooks in the second direction, the at least one pair of hooks has a second distance greater than the first distance therebetween in the second direction;
   wherein a positioning groove is formed on the limiting structure and is configured to accommodate a protruded portion of the movement portion, the positioning groove comprises a first portion and a second portion, an extending direction of the first portion is different from an extending direction of the second portion, the protruded portion is able to move freely in the first portion, and the protruded portion is able to be positioned in the second portion.

2. The fixing device according to claim 1, wherein the limiting structure comprises a first limiting member and a second limiting member, and at least one portion of the movement portion is disposed between the first limiting member and the second limiting member.

3. The fixing device according to claim 2, wherein the first limiting member comprises:
   an upper end opening;
   a lower end opening opposite to the upper end opening; and
   a front side opening interconnected with the upper end opening, the lower end opening and the accommodation space, wherein the front side opening exposes a portion of the second limiting member and the movement portion.

4. The fixing device according to claim 3, wherein the first limiting member comprises two blocking pieces corresponding to the lower end opening and extended to inside of the first limiting member, wherein extending directions of the two blocking pieces are parallel to the second direction.

5. The fixing device according to claim 4, wherein the second limiting member comprises:
   a body portion;
   two extending portions connected to the body portion, wherein the at least one pair of hooks are formed at bottoms of the two extending portions;
   two side grooves disposed on two opposite sides of the body portion; and
   a rear end groove disposed between the two side grooves, wherein the two side grooves are separated from each other.

6. The fixing device according to claim 5 wherein the movement portion comprises:
   a core portion;
   two side fixing members connected to the core portion, wherein terminal ends of the two side fixing members respectively have a latch structure; and
   a middle fixing member connected to the core portion and disposed between the two side fixing members, wherein the middle fixing member comprises a rod portion and an expanded portion connected to the rod portion, and a width of the expanded portion in the second direction is greater than a width of the rod portion in the second direction.

7. The fixing device according to claim 6, wherein the two side grooves of the body portion of the second limiting member have a plurality of notches, the two side grooves are used to accommodate the two side fixing members, and each of the notches is engaged with the latch structure.

8. The fixing device according to claim 2, further comprising an upper cover, wherein two sides of the upper cover respectively have a fixing mechanism, two sides of the first limiting member respectively have a through hole, and the fixing mechanism is used to engage with the through hole.

9. The fixing device according to claim 2, wherein the first limiting member comprises:
   a main portion;
   an upper end opening;
   a lower end opening opposite to the upper end opening; and
   a rear side opening interconnected with the upper end opening, the lower end opening and the accommodation space;
   wherein the first limiting member comprises a first structure and a second structure and is connected to the main portion, the first structure and the second structure correspond to the lower end opening, and a gap is formed between the first structure and the second structure.

10. The fixing device according to claim 9, wherein the first limiting member has a positioning groove interconnected with the upper end opening, and the positioning groove has a S-shaped appearance.

11. The fixing device according to claim 10, further comprising at least one slit adjacent to the positioning groove.

12. The fixing device according to claim 9, wherein the first limiting member has the positioning groove, and the positioning groove is adjacent to the upper end opening.

13. The fixing device according to claim 12, wherein the positioning groove further comprises a third portion, and an extending direction of the third portion is intersected with the extending direction the second portion.

14. A fixing device comprising:
a limiting structure extended along a first direction and having an accommodation space and at least one pair of hooks disposed at a terminal end of the limiting structure, wherein extending directions of the at least one pair of hooks are opposite to each other and respectively are parallel to a second direction perpendicular to the first direction, and the limiting structure comprises a first limiting member and a second limiting member; and
a movement portion disposed in the accommodation space and configured to move relative to the limiting structure, wherein at least one portion of the movement portion is disposed between the first limiting member and the second limiting member, wherein the first limiting member comprises:
a main portion;
an upper end opening;
a lower end opening opposite to the upper end opening; and
a rear side opening interconnected with the upper end opening, the lower end opening and the accommodation space;
wherein the first limiting member comprises a first structure and a second structure and is connected to the main portion, the first structure and the second structure correspond to the lower end opening, and a gap is formed between the first structure and the second structure;
when a bottom of the movement portion is disposed above the at least one pair of hooks, the at least one pair of hooks has a first distance therebetween in the second direction; when the bottom of the movement portion overlaps the at least one pair of hooks in the second direction, the at least one pair of hooks has a second distance greater than the first distance therebetween in the second direction;
wherein the second limiting member comprises:
an upper end hole;
a lower end hole opposite to the upper end hole; and
a front side opening interconnected with the upper end hole, the lower end hole and the accommodation space,
wherein the first limiting member and the second limiting member are assembled and surround the accommodation space.

15. The fixing device according to claim 14, wherein the second limiting member further comprises:
a rear side housing;
a side housing connected to the rear side housing; and
a fixing mechanism connected to the rear side housing, wherein the fixing mechanism and the side housing are stacked in the first direction, and a gap is formed between the fixing mechanism and the side housing.

16. The fixing device according to claim 14, wherein the first limiting member further comprises a side through hole, the side through hole is disposed on a side wall of the first limiting member and corresponds to the fixing mechanism, and as the fixing mechanism and the side through hole are mutually engaged, the first limiting member and the second limiting member are mutually fixed.

17. The fixing device according to claim 2, wherein the movement portion comprises:
an expanded portion;
a rod portion connected to the expanded portion and passing through the accommodation space along the first direction, wherein a width of the expanded portion in the second direction is greater than a width of the rod portion in the second direction; and
a protruded portion disposed on the rod portion,
wherein, as the protruded portion and a positioning groove of the first limiting member are mutually engaged, the movement portion and the first limiting member are mutually fixed.

18. The fixing device according to claim 17, further comprising a spring structure, the spring structure surrounds the rod portion and enables the movement portion to perform reciprocal movement along an axis parallel to the first direction.

19. The fixing device according to claim 2, wherein the pair of hooks are engaged with a counter member.

20. The fixing device according to claim 19, wherein a back of the first limiting member is fixed on a first plate structure, and a bottom of the counter member is fixed on a second plate structure.

* * * * *